(12) United States Patent
Ceroll et al.

(10) Patent No.: US 9,724,767 B2
(45) Date of Patent: *Aug. 8, 2017

(54) ROUTER

(71) Applicant: Black & Decker Inc., Newark, DE (US)

(72) Inventors: Warren A. Ceroll, Owings Mills, MD (US); Craig Schell, Street, MD (US)

(73) Assignee: Black & Decker Inc., Newark, DE (US)

( * ) Notice: Subject to any disclaimer, the term of this patent is extended or adjusted under 35 U.S.C. 154(b) by 650 days.

This patent is subject to a terminal disclaimer.

(21) Appl. No.: 14/103,751

(22) Filed: Dec. 11, 2013

(65) Prior Publication Data

US 2014/0105702 A1 Apr. 17, 2014

Related U.S. Application Data

(63) Continuation of application No. 12/706,606, filed on Feb. 16, 2010, now Pat. No. 8,628,280.

(60) Provisional application No. 61/207,675, filed on Feb. 13, 2009.

(51) Int. Cl.
| | |
|---|---|
| *B23C 1/20* | (2006.01) |
| *B27C 5/10* | (2006.01) |
| *B27C 5/02* | (2006.01) |
| *B25H 1/00* | (2006.01) |

(52) U.S. Cl.
CPC ............. *B23C 1/20* (2013.01); *B25H 1/0021* (2013.01); *B27C 5/02* (2013.01); *B27C 5/10* (2013.01); *Y10T 409/306608* (2015.01)

(58) Field of Classification Search
CPC . Y10T 409/306552; Y10T 409/306608; Y10T 409/306216; Y10T 409/306496; Y10T 409/306272–409/30644; B23C 1/20; B25H 1/0021; B27C 5/10
USPC ................ 409/181–182, 175, 180, 176–179; 144/136.95, 154.5, 136.1
See application file for complete search history.

(56) References Cited

U.S. PATENT DOCUMENTS

| | | | | |
|---|---|---|---|---|
| 1,245,677 | A | * 11/1917 | Campbell | ................. B27F 5/12 409/175 |
| 1,356,394 | A | * 10/1920 | Norris | ....................... B27F 5/02 409/175 |
| 1,565,790 | A | 12/1925 | Carter | |
| 1,581,720 | A | 4/1926 | Carter | |

(Continued)

FOREIGN PATENT DOCUMENTS

| | | | |
|---|---|---|---|
| CH | 171092 A | 8/1934 | |
| DE | 3417862 A1 | * 1/1986 | ............... B23C 1/20 |

(Continued)

OTHER PUBLICATIONS

Definition of "motor", Merriam-Webster's Collegiate Dictionary, $10^{th}$ ed., p. 760, copyright 1998.*

(Continued)

*Primary Examiner* — Erica E Cadugan
(74) *Attorney, Agent, or Firm* — Brake Hughes Bellermann LLP

(57) ABSTRACT

A router includes a motor assembly that is arranged and configured to hold a router tool and to impart rotation to the router tool and a frame that is fixed in size and that is configured to house the motor assembly.

20 Claims, 31 Drawing Sheets

(56) References Cited

U.S. PATENT DOCUMENTS

| | | | |
|---|---|---|---|
| 1,698,068 A * | 1/1929 | Ranney | B27F 5/12 |
| | | | 409/175 |
| 2,592,187 A | 4/1952 | Rohrer | |
| 2,855,963 A | 10/1958 | Potter | |
| 2,888,965 A * | 6/1959 | Phillips | B25H 1/0078 |
| | | | 144/136.95 |
| 3,495,636 A | 2/1970 | Smith | |
| 3,587,387 A | 6/1971 | Burrows | |
| 3,739,824 A | 6/1973 | Hoenig | |
| 3,767,876 A | 10/1973 | Batson | |
| 4,316,685 A | 2/1982 | George | |
| 4,319,860 A | 3/1982 | Beares | |
| 4,349,301 A | 9/1982 | Boyajian | |
| 4,445,811 A | 5/1984 | Sanders | |
| 4,484,608 A | 11/1984 | Ferdinand et al. | |
| 4,566,830 A | 1/1986 | Maier et al. | |
| 4,652,191 A | 3/1987 | Bernier et al. | |
| 4,679,606 A | 7/1987 | Bassett | |
| 4,718,468 A | 1/1988 | Cowman | |
| 4,770,573 A | 9/1988 | Monobe | |
| D300,501 S | 4/1989 | Zurwelle | |
| 4,938,264 A | 7/1990 | Ferenczffy | |
| 5,058,688 A | 10/1991 | Scott et al. | |
| 5,133,566 A | 7/1992 | Baker | |
| 5,143,494 A | 9/1992 | McCurry | |
| 5,191,921 A | 3/1993 | McCurry | |
| 5,191,968 A | 3/1993 | McCurry | |
| 5,207,253 A | 5/1993 | Hoshino et al. | |
| 5,253,400 A | 10/1993 | Conachen | |
| 5,273,089 A | 12/1993 | Fuchs et al. | |
| 5,310,296 A | 5/1994 | McCurry | |
| 5,429,162 A | 7/1995 | Bonnett | |
| 5,551,813 A | 9/1996 | Bonnett | |
| 5,570,776 A | 11/1996 | Buchholz et al. | |
| 5,584,620 A | 12/1996 | Blickhan et al. | |
| 5,590,988 A | 1/1997 | Rusconi | |
| 5,590,989 A | 1/1997 | Mulvihill | |
| 5,662,440 A | 9/1997 | Kikuchi et al. | |
| 5,772,368 A | 6/1998 | Posh | |
| 5,845,688 A | 12/1998 | Qian | |
| 5,961,257 A | 10/1999 | Bettini et al. | |
| 5,998,897 A | 12/1999 | Bosten et al. | |
| 6,024,144 A | 2/2000 | Qian | |
| 6,113,323 A | 9/2000 | Bosten et al. | |
| 6,237,657 B1 | 5/2001 | Qian | |
| RE37,247 E | 6/2001 | Blickhan et al. | |
| 6,244,797 B1 | 6/2001 | Wheeler | |
| D444,364 S | 7/2001 | Evans | |
| 6,261,036 B1 | 7/2001 | Bosten et al. | |
| 6,318,936 B1 | 11/2001 | McFarlin, Jr. et al. | |
| D470,375 S | 2/2003 | Lopano | |
| D470,377 S | 2/2003 | Lopano | |
| D470,736 S | 2/2003 | Lopano | |
| D473,439 S | 4/2003 | Grant et al. | |
| D473,772 S | 4/2003 | Lopano | |
| 6,558,091 B2 | 5/2003 | Smith et al. | |
| D495,226 S | 8/2004 | Grant et al. | |
| 6,779,954 B2 | 8/2004 | Tomayko | |
| 6,843,328 B2 | 1/2005 | Boyl-Davis et al. | |
| 6,896,454 B2 | 5/2005 | Gerhardt et al. | |
| 7,036,539 B2 | 5/2006 | Sherman et al. | |
| 7,044,694 B2 | 5/2006 | Lowder et al. | |
| 7,089,979 B2 | 8/2006 | Cooper et al. | |
| D531,871 S | 11/2006 | Etter et al. | |
| 7,140,817 B1 | 11/2006 | Phillips et al. | |
| D545,158 S | 6/2007 | Corcoran | |
| 7,226,257 B2 | 6/2007 | Lowder et al. | |
| D546,654 S | 7/2007 | Etter et al. | |
| 7,255,520 B2 | 8/2007 | Taylor | |
| 7,273,333 B2 | 9/2007 | Buttrick, Jr. et al. | |
| D553,930 S | 10/2007 | Robson | |
| 7,275,900 B1 | 10/2007 | Phillips et al. | |
| 7,281,887 B2 | 10/2007 | Taylor | |
| D559,875 S | 1/2008 | McDaniel et al. | |
| 7,316,528 B2 | 1/2008 | Cooper et al. | |
| 7,316,529 B2 | 1/2008 | Phillips et al. | |
| 7,334,613 B2 | 2/2008 | Griffin et al. | |
| D567,613 S | 4/2008 | Steinfels | |
| 7,402,008 B2 | 7/2008 | Phillips et al. | |
| 7,484,915 B2 | 2/2009 | Robson | |
| 7,490,642 B1 | 2/2009 | Cooper et al. | |
| D588,428 S | 3/2009 | Etter et al. | |
| 7,524,150 B2 | 4/2009 | Zaiser et al. | |
| 7,588,400 B2 | 9/2009 | Taylor | |
| 8,628,280 B2 * | 1/2014 | Ceroll | B27C 5/10 |
| | | | 144/136.95 |
| 2004/0222600 A1 | 11/2004 | Jacobs et al. | |
| 2004/0253068 A1 | 12/2004 | Gerhardt et al. | |
| 2005/0006000 A1 | 1/2005 | Freese et al. | |
| 2006/0045643 A1 * | 3/2006 | Petersen | B27C 5/02 |
| | | | 409/182 |
| 2006/0182507 A1 | 8/2006 | Lowder et al. | |
| 2006/0280570 A1 | 12/2006 | Taylor | |
| 2007/0098510 A1 | 5/2007 | Phillips et al. | |
| 2008/0008551 A1 | 1/2008 | Robson | |
| 2008/0050194 A1 | 2/2008 | Phillips et al. | |
| 2008/0069655 A1 | 3/2008 | Taylor | |
| 2008/0149222 A1 | 6/2008 | Zaiser et al. | |
| 2008/0152450 A1 | 6/2008 | Zaiser et al. | |
| 2008/0196912 A1 | 8/2008 | Gass et al. | |
| 2008/0210337 A1 | 9/2008 | Sommerville et al. | |
| 2008/0283147 A1 | 11/2008 | Cooper et al. | |
| 2008/0302447 A1 | 12/2008 | Griffin et al. | |
| 2009/0050235 A1 | 2/2009 | Sommerville et al. | |
| 2009/0114314 A1 | 5/2009 | Robson | |
| 2009/0116923 A1 | 5/2009 | Kimura et al. | |
| 2010/0215453 A1 | 8/2010 | Ceroll et al. | |

FOREIGN PATENT DOCUMENTS

| | | |
|---|---|---|
| DE | 3940910 A1 | 6/1991 |
| EP | 1 798 012 B1 | 2/2008 |
| WO | 2008/106723 A1 | 9/2008 |
| WO | 2010/094046 A2 | 8/2010 |

OTHER PUBLICATIONS

International Search Report and Written Opinion for PCT Application No. PCT/US2010/024329, dated Nov. 19, 2010, 26 pages.*
"Triton: Precision Power Tools", Product Catalogue, www.tritontools.com, 2009/2010, 13 pages.
Office Action receieved for U.S. Appl. No. 12/706,606, mailed on May 10, 2013, 9 pages.
Office Action Response filed for U.S. Appl. No. 12/706,606, filed Aug. 12, 2013, 9 pages.
Notice of Allowance for U.S. Appl. No. 12/706,606, mailed on Sep. 12, 2013, 22 pages
Extended European Search Report for EP Application No. 10741887.3 dated Aug. 28, 2015, 14 pages.
Anonymous, "Uuuuaaaah . . . ! I have started building now . . . !—p. 34—ED Forums", Sep. 5, 2008, pp. 1-12, retrieved from the Internet: URL:http://forums.eagle.ru/showthread.php?t=27270&page=34.
European Search Report for EP Application No. 10741887.3 dated Apr. 22, 2015, 7 pages.

* cited by examiner

ROUTER

CROSS-REFERENCE TO RELATED APPLICATION

This application is a continuation application and claims the benefit of U.S. application Ser. No. 12/706,606, filed on Feb. 16, 2010 and titled "Router", now U.S. Pat. No. 8,628,280, which claims the benefit of U.S. Provisional Patent Application No. 61/207,675, filed on Feb. 13, 2009 and titled "Router", both of which are incorporated herein by reference in entirety.

TECHNICAL FIELD

This description relates to a router.

BACKGROUND

A router may be utilized by tradesmen, craftsmen, hobbyists and other users to perform various tasks. For instance, a router may be used to perform intricate cutting projects, such as decorative profiles and trimming laminates on the edges or perimeters of a workpiece. A router also may be utilized to form grooved areas in woodworking and other material as well as to remove excess material on workpieces. Routers may utilize various types of cutting tools or router bits in order to perform these and other types of tasks.

A router may be categorized into a type of router based on the manner in which the router may be operated. For example, two types of routers include plunge routers and fixed base routers. In the example of a plunge router, the plunge router may be configured to plunge the cutting tool or router bit into a workpiece. The plunge router may be turned on and the cutting tool lowered into the workpiece such that it cuts the workpiece as it is lowered and engages the workpiece. The cutting tool cuts its way in to the workpiece. Users of plunge routers may desire a smooth depth transition while plunging the router bit into the workpiece. This smooth depth transition enhances control.

In the example of a fixed base router, the cutting tool or router bit is fixed in position relative to the base of the router until it is adjusted for a different depth. Fixed base routers may be used primarily for edge work; however, other fixed base routers may be used in other manners as well.

When changing the cutting tool or the router bit, it is typically necessary to use hand tools such as wrenches, or the like, in order to provide adequate mechanical advantage to safely tighten or loosen the cutting tool or the router bit. For instance, changing a cutting tool or router bit may require the use of a first wrench to lock a router drive shaft from rotation while a second wrench is used to loosen a bit, which may be rotationally and axially fixed to the drive shaft using a collet. It may be desirable to easily attach a bit to the drive shaft or to easily and/or quickly remove the bit from the drive shaft. For example, several router bits may be needed throughout the course of shaping a single workpiece with a router, and it may be desirable to change between the bits easily and efficiently. The use of multiple wrenches or like tools for changing between the bits may be inefficient and thus may be undesirable in such applications. Additionally, because a collet or the like for engaging the router bit may be recessed within a shield or shroud, or surrounded by an assembly such as a router table or the like, it may be difficult to reach the collet and the drive shaft with tools such as wrenches, or the like, for changing the bit.

SUMMARY

According to one general aspect, a router may include a motor assembly, a first rail and a second rail and a first rolling element pair mounted to the motor assembly and a second rolling element pair mounted to the motor assembly, where the first rolling element pair engages the first rail and the second rolling element pair engages the second rail.

Implementations may include one or more of the following features. For example, the router may further include a housing, where the first rail and the second rail are attached to inside walls of the housing. The housing may include a top member and a base having an aperture, where the first rail and the second rail are attached at one end to the top member and at an other end to the base. The housing may be a fixed height. The first rail may be parallel to the second rail.

The first rolling element pair may include a first ball bearing attached to the motor assembly and a second ball bearing attached to the motor assembly, the first ball bearing and the second ball bearing positioned to engage the first rail at an angle. The second rolling element pair may include a first ball bearing attached to the motor assembly and a second ball bearing attached to the motor assembly, the first ball bearing and the second ball bearing positioned to engage the second rail at an angle. The router may further include a third rolling element pair mounted to the motor assembly, where the third rolling element pair engages the first rail. The router may further include a fourth rolling element pair mounted to the motor assembly, where the fourth rolling element pair engages the second rail.

The router may further include a housing including a top member and a base and at least one biasing member coupled to the motor assembly to bias the motor assembly towards the top member. The router may further include a split housing. The motor assembly may include a motor housing, a motor disposed in the motor housing, the motor including a shaft and the motor configured to impart rotation to the shaft and a router tool holder coupled to the shaft.

In another general aspect, a router may include a housing including a top member and a base having an aperture, a motor assembly disposed in the housing, a first rail operatively connected to the housing, a first rolling element pair mounted to the motor assembly, where the first rolling element pair engages the first rail and at least one biasing member coupled to the motor assembly to bias the motor assembly towards the top member.

Implementations may include one or more of the following features. For example, the router may further include a second rail operatively connected to the housing and a second rolling element pair mounted to the motor assembly, where the second rolling element pair engages the second rail. The first rail may be parallel to the second rail. The housing may be a split housing. The split housing may be secured together using at least one fastener. The housing may be a fixed height.

The router may further include a third rolling element pair mounted to the motor assembly, where the third rolling element pair engages the first rail. The router may further include a fourth rolling element pair mounted to the motor assembly, where the fourth rolling element pair engages the second rail.

In another general aspect, a router may include a housing, a motor assembly disposed in the housing, a first rail operatively connected to the housing and means for slidably engaging the motor assembly with the first rail.

Implementations may include one or more of the following features. For example, the router may further include a second rail operatively connected to the housing, where the means for slidably engaging the motor assembly includes means for slidably engaging the motor assembly with the first rail and the second rail. The means for slidably engaging the motor assembly with the first rail and the second rail may include a first rolling element pair mounted to the motor assembly and a second rolling element pair mounted to the motor assembly, where the first rolling element pair engages the first rail and the second rolling element engages the second rail. The means for slidably engaging the motor assembly with the first rail and the second rail may further include a third rolling element pair mounted to the motor assembly, where the third rolling element pair engages the first rail. The means for slidably engaging the motor assembly with the first rail and the second rail may further include a fourth rolling element pair mounted to the motor assembly, where the fourth rolling element pair engages the second rail. The housing may be a fixed height.

In another general aspect, a router may include a motor assembly that is arranged and configured to hold a router tool and to impart rotation to the router tool and a frame that is fixed in size and that is configured to house the motor assembly.

Implementations may include one or more of the following features. For example, the frame may include a top member, a base having an aperture to enable the router tool to engage a workpiece and side members having a fixed length, the side members coupling the top member and the base. The top member may be configured to be secured in a table. The top member may be configured to be secured in a structure having a pin for use as a pin router. The router may further include a first rail and a second rail disposed within the frame and a first rolling element pair mounted to the motor assembly and a second rolling element pair mounted to the motor assembly, where the first rolling element pair engages the first rail and the second rolling element engages the second rail. The router may further include a first handle attached to the motor assembly and a second handle attached to the motor assembly. The frame may be configured to be secured in a router table.

In another general aspect, a router table may include a top surface configured to support a workpiece and a bottom surface comprising means for securing a portable router, the portable router including a frame having a fixed size.

In another general aspect, a pin router may include a base member including a guide member and an arm member connected to the base member, the arm member including means for securing a portable router, the portable router including a frame having a fixed size.

Implementations may include one or more of the following features. For example, the guide member may include a pin.

In another general aspect, a router may include a housing, a motor assembly disposed within the housing, the motor assembly including a driven shaft having a cavity on a first end of the driven shaft, where a portion of the first end of the driven shaft includes external threads, a collet that is configured to mate into the cavity of the driven shaft, the collet being configured to grip a shank of a router bit, a nut having an axial bore with internal threads for cooperating with the external threads on the first end of the driven shaft and a locking mechanism that is configured to engage the nut to prevent rotation of the nut such that a rotation of a second end of the driven shaft when the locking mechanism is engaged causes at least one of tightening and loosening of the collet.

Implementations may include one or more of the following features. For example, the locking mechanism may remain engaged with the nut without a constant application of force by a user. The nut may include a hole in a side of the nut and the locking mechanism may include a pin that is configured to engage the hole in the nut to prevent rotation of the nut. The second end of the driven shaft may extend beyond an end of the housing and may be configured to receive a tool to cause rotation of the shaft.

In another general aspect, a router may include a housing, a motor assembly disposed within the housing, the motor assembly including a driven shaft having a cavity on a first end of the driven shaft, a collet that is configured to mate into the cavity of the driven shaft, the collet being configured to grip a shank of a router bit and a gear mechanism that is configured to couple and decouple from a second end of the driven shaft such that a rotation of the gear mechanism when the gear mechanism is coupled to the second end of the driven shaft causes at least one of tightening and loosening of the collet.

Implementations may include one or more of the following features. For example, the gear mechanism may include a planetary gear mechanism. The gear mechanism may be configured to be operated by hand.

In another general aspect, a router may include a motor assembly, a frame including a top member, a base having an aperture, and at least two parallel rails connecting the top member and the base, a bushing member connected to the motor assembly, where the bushing member and the motor assembly are configured to traverse along the rails and the bushing member including an orifice, an extrusion configured to fit within the orifice of the bushing member, the extrusion including a threaded orifice and a threaded rod extending through the threaded orifice of the extrusion, where when the extrusion is locked to the bushing, the motor assembly includes a fixed base mode and when the extrusion is released from the bushing, the motor assembly includes a free translation mode.

Implementations may include one or more of the following features. For example, when the extrusion is locked to the bushing, the motor assembly include one of a fixed base mode and a micro-adjust mode. The router may further include a micro-adjust control coupled to the threaded rod. The router may further include a macro-adjust control coupled to the threaded rod. The motor assembly may include a brushless motor.

In another general aspect, a router may include a motor assembly that is arranged and configured to hold a router tool and to impart rotation to the router tool and a frame that is configured to house the motor assembly, the frame including at least one side configured to mount the frame to a structure.

Implementations may include one or more of the following features. For example, the router may further include a remote switch for controlling power to the motor assembly, the remote switch including an outlet configured to receive a plug. The router may further include an opening that is configured to receive an motor air cooling duct. The router may further include an anti-backlash height adjustment mechanism.

In another general aspect, a router may include a motor assembly, at least a first rail and at least a first rolling element pair mounted to the motor assembly, where the first rolling element pair engages the first rail.

Implementations may include one or more of the following features. For example, the router may further include a second rail operably coupled to the motor assembly, where the second rail is configured as a clocking rail. The router may further include a bushing attached to the motor assembly, where the second rail is operably coupled to the motor assembly using the bushing. The router may further include a second rolling element pair mounted to the motor assembly, where the second rolling element pair engages the first rail. The router may further include a third rolling element pair mounted to the motor assembly, where the third rolling element pair engages the first rail.

The details of one or more implementations are set forth in the accompanying drawings and the description below. Other features will be apparent from the description and drawings, and from the claims.

BRIEF DESCRIPTION OF THE DRAWINGS

Like reference numerals in the figures may indicate a same or similar component.

DETAILED DESCRIPTION

This document describes systems and techniques related to routers and various components related to routers. The implementations described in this document may be implemented as individual features on a router and/or as a combination of some or all features on a router.

In one general aspect, this document describes exemplary implementations of a router that may include improvements to provide mechanisms related to the movement of the router motor assembly. These exemplary router implementations include a motor assembly, a first rail and a second rail. In one exemplary implementation, a first rolling element pair is positioned to engage the motor assembly and the first rail and a second rolling element pair is positioned to engage the motor assembly and the second rail. In this manner, the motor assembly may traverse the rails in an axial direction along the first rail and the second rail. In another exemplary implementation, only a first rolling element pair is positioned to engage the motor assembly and the first rail. These and other exemplary router implementations are described in more detail below. These exemplary router implementations may provide a more compact router size having smoother movements and improved user visibility at the base of the router.

In another general aspect, this document also describes exemplary router implementations having a motor assembly that is arranged and configured to hold a cutting tool and to impart rotation to the cutting tool. The motor assembly is disposed within a frame that is fixed in size and that is configured to house the motor assembly. In this manner, the frame may be a closed frame having a fixed height. Various implementations are described in this document that use the fixed height frame of the router including options for the stationary mounting of the router.

In another general aspect, this document further describes improvements to enable a user to more easily change router bits. In one exemplary implementation, a router may include a locking mechanism that is used to prevent the collet nut from rotating. In this manner, the user may use an implement at the top end of the router to rotate the shaft to loosen and tighten the collet, thus providing a more convenient location for the user to change the router bit. This document also describes other exemplary implementations for changing a router bit without using any tools.

In another general aspect, this document describes an exemplary router that includes improved adjustment controls including improved placement of the adjustment controls such as, for example, a macro adjust control and a micro adjust control. In this exemplary router, the router may be configured to operate in different modes of operation including a plunge mode and a fixed base mode.

These and other general and specific aspects are described below in more detail with reference to the figures and in the claims.

Figure 1:
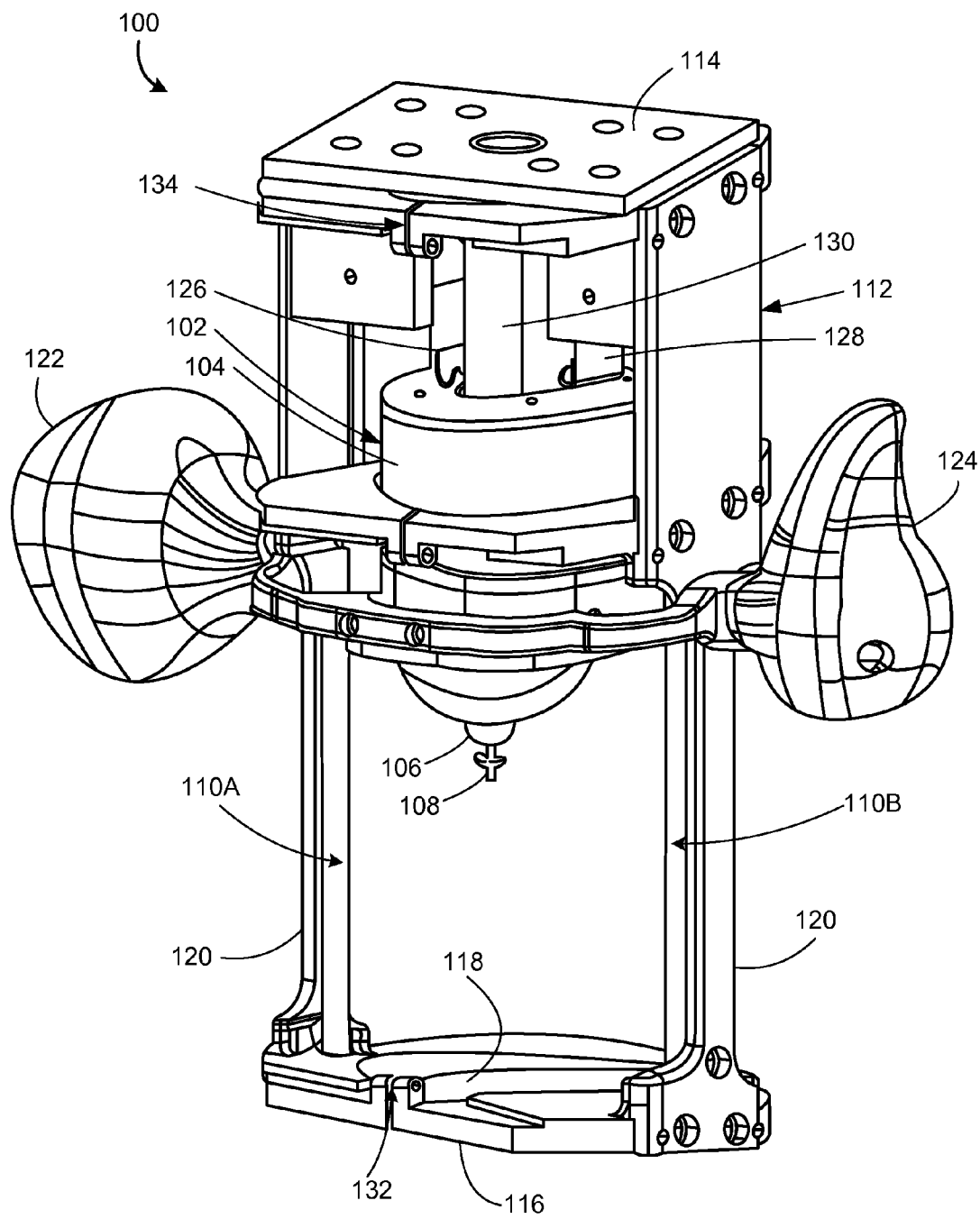
FIG. 1 is an isometric view illustrating an exemplary router.

Referring to FIG. 1, an exemplary router 100 is illustrated. In one exemplary implementation, router 100 may be configured for use as a plunge router. In this exemplary implementation, router 100 uses rails and rolling element pairs to slide a motor assembly up and down in an axial direction.

The axial movement of the motor assembly along the rails enables a user to plunge the motor assembly or adjust the router bit height relative to the base, which grips a cutting tool, into a workpiece.

Router 100 includes a motor assembly 102. The motor assembly includes a motor housing 104, a driven shaft 106, which may be configured to grip and hold a cutting tool 108. Throughout this document, the term cutting tool may be used interchangeably with cutting implement, router bit and other like terms to refer to the component that is gripped by the motor assembly and engages a workpiece. Throughout this document, the term workpiece may be used interchangeably with other like terms to refer to the material, which may include various different types of material, that is engaged by the cutting tool.

The cutting tool 108 may be interchanged with other cutting tools having various shapes for cutting into workpieces. The motor assembly includes a motor (not shown) which imparts rotational motion to the shaft 106, which in turn causes the rotation of the cutting tool 108.

In the example of FIG. 1, a first rail 110A and a second rail 110B are illustrated. Rolling element pairs (not shown in FIG. 1) may be used to enable the motor assembly 102 to traverse along the rails 110A, 110B. The rolling element pairs are illustrated in more detail in the exemplary cross-sectional top view of FIG. 2, which is described below. The motor assembly 102 may traverse along rails 110A, 110B in an axial direction.

Router 100 includes a housing 112. The housing 112 may include a top member 114, a base 116 having an aperture 118 and side walls 120. In one exemplary implementation, the sidewalls 120 may extend from the top member 114 to the base 116. In one exemplary implementation, the sidewalls 120 are fixed in length from the top member 114 to the base 116. In this manner, the overall height of the router 100, as measured from the base 116 to the top member 114, may remain fixed in size.

The rails 110A, 110B may be nestled against sidewalls 120. The rails 110A, 110B and the sidewalls 120 also may be integrated, homogenous parts. The rails 110A, 110B may be parallel to each other in the same manner that each of the sidewalls is parallel to each other. The top member 114 may be secured on a bottom side to each of the sidewalls 120. In other implementations, the top member 114 may be secured to the sidewalls 120 in other configurations. The base member 116 includes the aperture 118 to allow the motor assembly 102 to traverse downward in an axial direction and enable the cutting tool 108 to penetrate through the aperture 118 to engage a workpiece (not shown).

Router 100 may include one or more handles 122, 124 to enable a user to grip and operate the router. As illustrated in FIG. 1, handles 122, 124 may be attached to the motor assembly 102. The handles 122, 124 may be ergonomically shaped to allow for a comfortable and secure grip by the user. The handles 122, 124 also may include control features such as the on/off switch, height adjustment control and locking controls. The handles 122, 124 may be gripped and used to push the motor assembly 102 down in an axial direction such that the cutting tool 108 moves toward the base 116 through the aperture 118 to engage a workpiece.

Router 100 may include one or more biasing members to bias the motor assembly 102 in a direction towards the top member 114 of the housing 112. In one exemplary implementation, springs 126 and 128 may be used as the biasing members. The biasing members may be configured to have a minimal amount of force change throughout their range of extension to enable for a good feeling of control by the user.

The springs 126, 128 may be connected to a top of the motor assembly 102 and include a rolled portion (not shown) that is secured within the housing 112 near the top member 114. When the motor assembly 102 is traversed in an axial direction towards the base 116, the springs 126, 128 unroll and extend with the motor assembly 102 towards the base 116. When the motor assembly 102 is released from the handles 122, 124 or otherwise pressure is no longer exerted downward, then the springs 126, 128 act to return the motor assembly 102 to an upper position towards the top member 114.

In one exemplary implementation, the router 100 may include a shaft (not shown in FIG. 1) and bushing 130. The shaft may be secured to the top member 114 and the bushing 130 may be secured to the motor assembly 102. The bushing 130 includes a concentric bore through which the shaft may slidably penetrate. The bushing 130 and the shaft may enable the motor assembly 102 to travel along the shaft in a downward and upward position. The shaft and bushing 130 are optional and also may assist in biasing the motor assembly 102 towards the top member 114. In one implementation, the bushing 130 may include at least two contact points. The bushing 130 may be implemented in other configurations including different shapes other than round. In another exemplary implementation, the motor housing 104 may be the shaft member of the bushing and shaft assembly.

In one exemplary implementation, the shaft may include a portion of threads, which may be used in conjunction with an internally threaded nut. This shaft and nut may be used to implement an adjustable depth and/or micro adjust for depth.

In router 100, the use of rails 110A, 110B and rolling element pairs may eliminate the need for multiple shaft and bushing systems that may be necessary to position the router bit access concentrically to the base. The rails 110A, 110B and the rolling element pairs may eliminate or reduce the need for closely toleranced sizes of guide shafts and bushings, secondary machining operations after assembly to achieve accuracy of position and perpendicularity, and the large ratio of length to diameter. The rails 110A, 110B also may act to prevent or reduce racking experienced in conventional systems.

In one exemplary implementation, the housing 112 may be a split housing. As illustrated in FIG. 1, a split housing may be when the base 116 and/or the top member 114 are not one, continuous solid piece. For example, the base 116 may be split at a point 132. Similarly, the top member 114 may be split at a point 134. The split housing may enable for adjustment of the position of the rails 110A, 110B during the manufacturing process. The split housing is illustrated in more detail in FIG. 5, which illustrates the base 116 at split point 132.

During manufacturing and/or assembly, the position of the rails 110A, 110B in relation to the rolling element pairs may be adjusted by squeezing the rails 110A, 110B together and securing the split housing with a fastener. In this manner, desired tolerances may be achieved between the rails 110A, 110B and the rolling element pairs without the expense and inefficiencies associated with more specific machining processes. Unlike rod and bushing pair, which may require a clearance to work, this rail and rolling element pair arrangement may be brought into intimate contact. The effect of the rail and rolling element pair arrangement is a bearing system with little or no play and still and easy, free movement.

Figure 6:
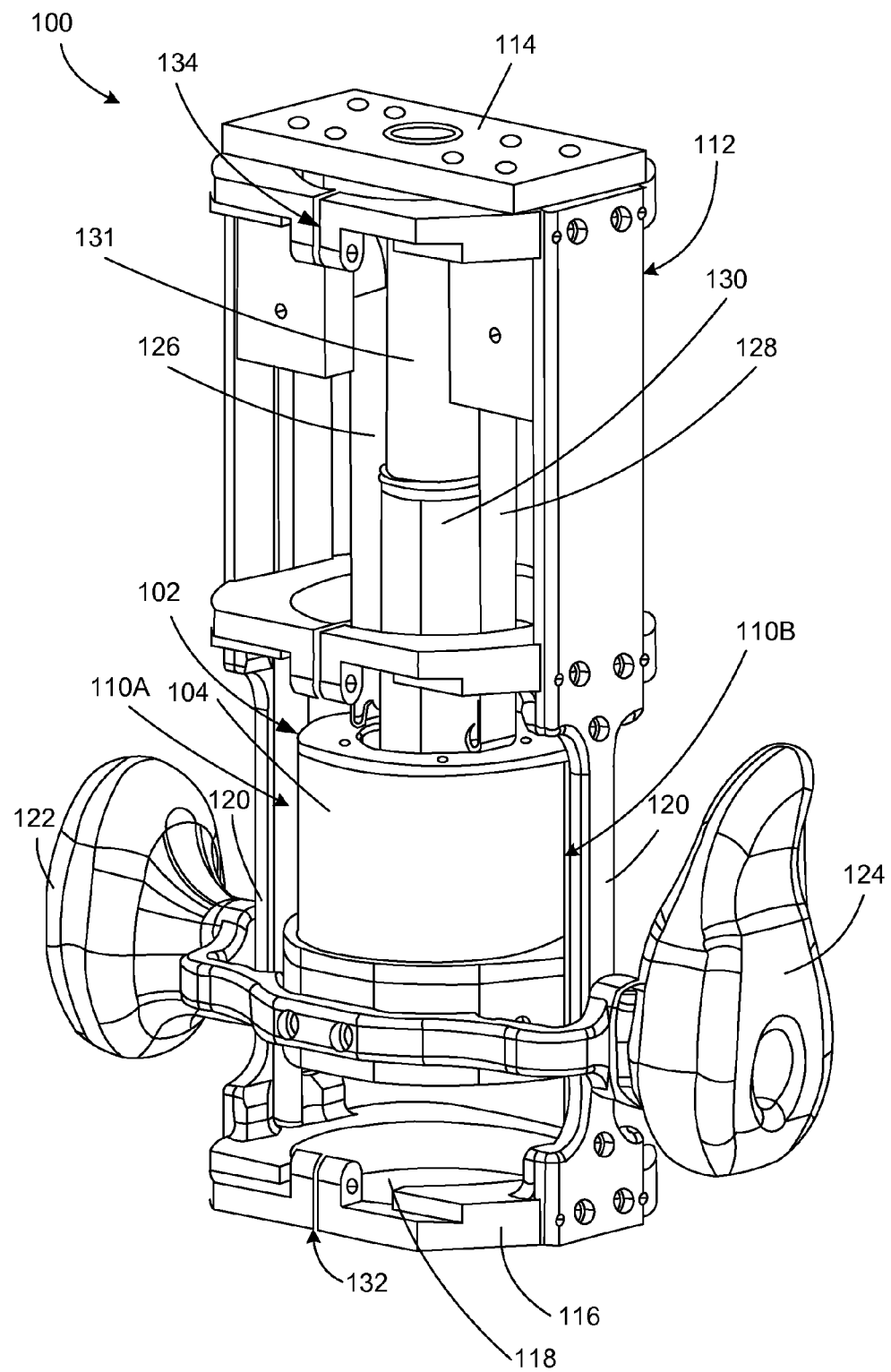
FIG. 6 is an isometric view illustrating the exemplary router of FIG. 1 with the motor assembly plunged downward.

As illustrated in FIG. 1, the router 100 is shown as biased in an upward position. FIG. 6, described in more detail below, illustrates the router 100 in a downward position. As can be seen from the illustration of FIG. 1, the user gains better visibility around the base 116 and the aperture 118. The better visibility may enable the user to better position the router 100 in relation to a workpiece. The base 116 is relatively free from obstructions and lends itself to multiple positions and frees up space to add dust collection port attachments as well as other desired attachments.

Figure 2:
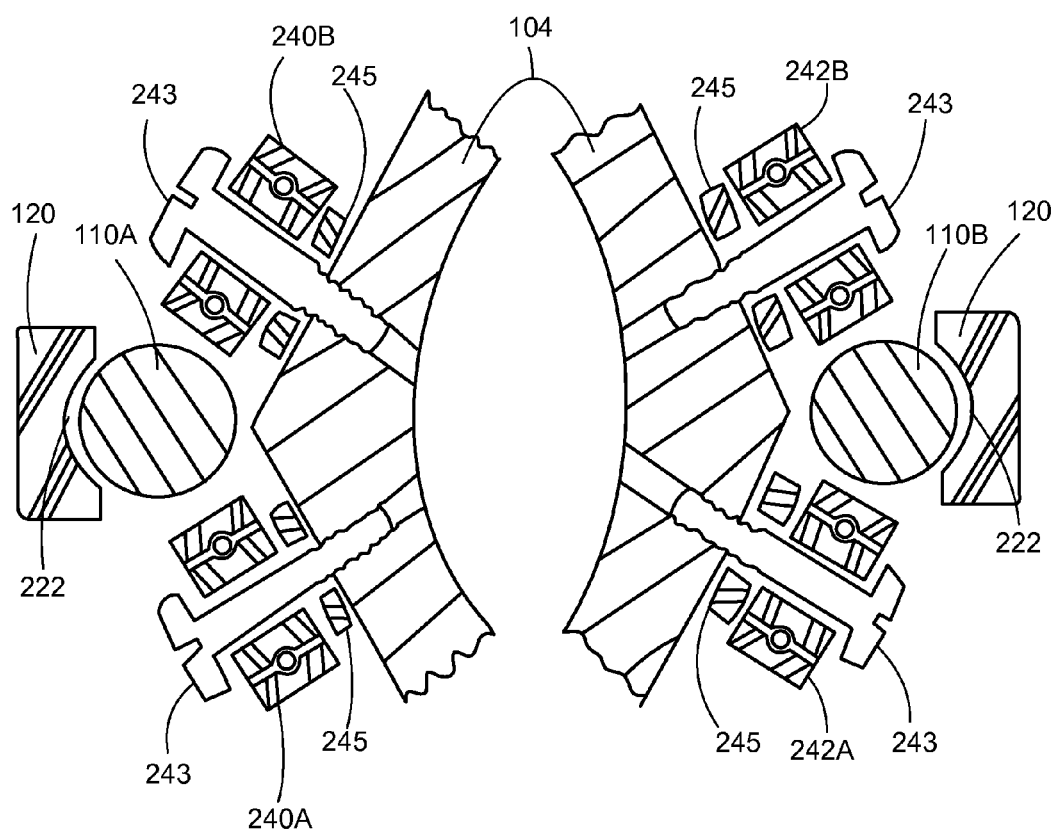
FIG. 2 is a cross-sectional top view of exemplary components of an exemplary router.

Referring also to FIG. 2, a cross-sectional top view of some of the components of router 100 of FIG. 1 is illustrated. FIG. 2 does not illustrate all of the components for reasons of simplicity. The rails 110A, 110B are illustrated as nestled next to the walls 120. In one exemplary implementation, each of the walls 120 may include a groove 222 that traverses the length of the sidewall to enable the rails 110A, 110B to fit securely against the sidewalls 120. In another exemplary implementation, the rails 110A, 110B may be attached to an inside of the walls 120. In another exemplary implementation, the rails 110A, 110B and the sidewalls 120 may be integrally formed.

The rails 110A, 110B may be cylindrical in shape and extend for a length that is desired to enable the motor assembly 102 to traverse in an axial direction. In one implementation, the rails 110A, 110B may be steel rods. In other exemplary implementations, other materials may be used as well. For instance, the rails 110A, 110B may be hollow, where the hollow portion of the rails may be used for dust collection. The use of hollow rails may reduce the weight of the router.

FIG. 2 illustrates one implementation of the rolling element pairs described above with respect to FIG. 1. In one implementation, rolling element pair 240A, 240B is positioned to engage rail 110A. The rolling element pair 240A, 240B may be attached to the motor housing 104. In one implementation, fasteners 243 and washers 245 may be used to attach the rolling element pair 240A, 240B to an outside of the motor housing 104. Other means for attaching the rolling element pair 240A, 240B also may be used.

In a similar manner, rolling element pair 242A, 242B may be secured to the motor housing 104 and positioned to engage rail 110B. Rolling element pair 242A, 242B also may be fastened to the motor housing 104 using fasteners 243 and washers 245. Other means for fastening or securing the rolling element pair 242A, 242B to the motor housing 104 may be used.

In one exemplary implementation, the rolling element pairs 240A, 240B, and 242A, 242B may be ball bearings that are mounted equidistant from angled surfaces that form an outside corner having an angle greater than zero and less that 180 degrees in relation to the motor housing 104 and the rails 110A, 110B. In one implementation, the ball bearing may be mounted equidistant from angled surfaces that form an outside corner of 90 degrees or greater in relation to the motor housing 104 and the rails 110A, 110B. As discussed above, the rails 110A, 110B may be parallel to each other. In this manner, the rolling element pairs, which may be ball bearings, contact the rails 110A, 110B at four tangent contact points that locate position and evenly distribute the load of the motor assembly 102 on the bearings. This arrangement may take up the tolerances in each bearing, thus creating an angular contact bearing.

In another exemplary implementation, the rails 110A, 110B may not be positioned on exact opposite sides from each other. The loading may be low enough to allow the rails 110A, 110B to be biased to one side to offer more access and visibility on the other side.

The rolling element pairs 240A, 240B and 242A, 242B may be ball bearings, where each pair of bearings are arranged in a V-shape that make a contact with its respective rail 110A, 110B. When attached to the motor housing 104, the rolling element pairs 240A, 240B and 242A, 242B traverse the rails 110A, 110B together as one. The use of the rolling element pairs enable the motor assembly 102 to freely traverse in an axial direction along the rails 110A, 110B. In other exemplary implementations, the rolling element pairs 240A, 240B and 242A, 242B may use different types of bearings. For example, the rolling element pairs may be other types of rolling element bearings such as cylindrical roller bearings, tapered roller bearings, needle bearings, or other types of bearings. In another implementation, the rolling element pairs may instead be sliding elements such as, for example, wear pads made of a material such as acetal, ultra high molecular weight polyethylene (UHMW), brass, bronze or other materials. In other exemplary implementations, different combinations of the rolling element pairs may be used together in the same router, with one type of rolling element pair on one rail and another type of rolling element pair on another rail.

The router 100 as illustrated in FIG. 1 and the rolling element pairs and rail system as illustrated in FIG. 2, may be an improvement over using just a standard bushing and shaft system. The rolling element pairs and rail system may be less expensive in terms of materials and a lower cost to manufacture and assembly. It also may provide for better visibility at the area of the workpiece and result in a more compact overall system.

Figure 3:
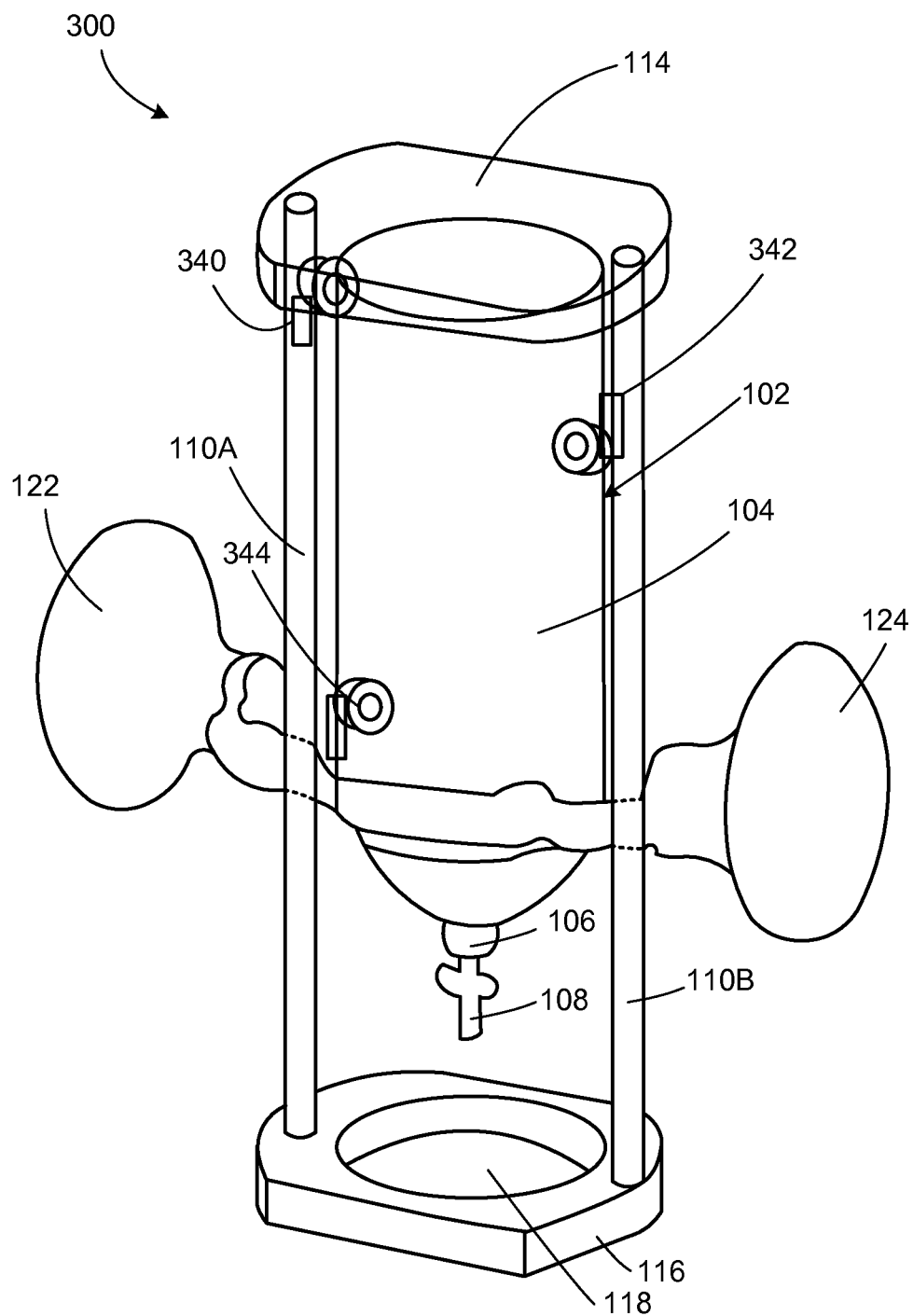
FIG. 3 is an isometric view illustrating an exemplary router.

Referring to FIG. 3, an exemplary router 300 is illustrated. Router 300 may include one or more of the same or similar components as described above with respect to FIGS. 1 and 2. In each of the illustrations throughout this document, like reference numbers may indicate like components. In the exemplary router 300, a third rolling element pair is illustrated, where the third rolling element pair engages one of the rails. In this manner, a bushing, such as bushing 130 of FIG. 1, may not be used.

The router 300 includes a motor assembly 102. The motor assembly 102 may include a motor (not shown), a motor housing 104, and a shaft 106 that is configured to impart rotational motion to a cutting tool 108. In FIG. 3, the housing may include a top member 114 and a base 116 having an aperture 118. The rails 110A, 110B may or may not form a part of the router housing and may extend along the length of the router 300. The rails 110A, 110B may be connected to the top member 114 and the base 116. In this implementation, the rails 110A, 110B may be secured in some manner to the top member 114 and the base 116. The rail 110A may be parallel to the rail 110B.

The router 300 also may include handles 122 and 124. The handles 122 and 124 are attached to the motor assembly 102 and enable a user to move the motor assembly 102 in an axial direction along the rails 110A, 110B from a position biased towards the top member 114 down towards the base 116. Although not illustrated in FIG. 3, at least one biasing member may be used to return the motor assembly 102 towards a position in the direction of the top member 114.

In this exemplary implementation, the router 300 may include three rolling element pairs. A first rolling element pair 340 may engage the rail 110A. A second rolling element pair 342 may be positioned to engage the rail 110B. As discussed above with respect to FIG. 2, the rolling element pair 340 and the rolling element pair 342 may be attached to the motor housing 104. Additionally, the router 300 may include a third rolling element pair 344, which may be positioned to engage rail 110A. Although the rolling element pair 344 is illustrated as engaging the rail 110A, in other exemplary implementations, the rolling element pair 344 may be attached to the motor housing 104 such that it is positioned to engage the rail 110B instead of rail 110A.

In one exemplary implementation, the rolling element pair 340 may be in a same plane as the rolling element pair 342. The third rolling element 344 may be positioned in a different plane that is either higher or lower than the plane in which the rolling element pairs 340 and 342 are in. The addition of rolling element pair 344 may be advantageous to fully constrain the sliding motor assembly 102 to the fixed rails 110A and 110B.

In another exemplary implementation, each of the rolling element pairs 340, 342, and 344 may be positioned along the motor housing 104 in different planes. In this manner, the rolling element pairs 340, 342, and 344 may form a triangular configuration.

As discussed above with respect to FIG. 2, the rolling element pairs 340, 342, 344 may include a first ball bearing and a second ball bearing that are attached to the motor housing 104 and positioned such that they engage the respective rails 110A, 110B at a desired angle. The angle at which each of the ball bearings may contact the rail may be greater than 0 degrees, but less than 180 degrees. For instance, in one exemplary implementation, the angle may be at least 90 degrees or greater, but less than 180 degrees. This arrangement of the ball bearings in relation to the rail may achieve desired tolerances to enable smooth linear operation of the motor assembly 102 as a user traverses it slidably in an axial manner towards and away from the workpiece.

Figure 4:
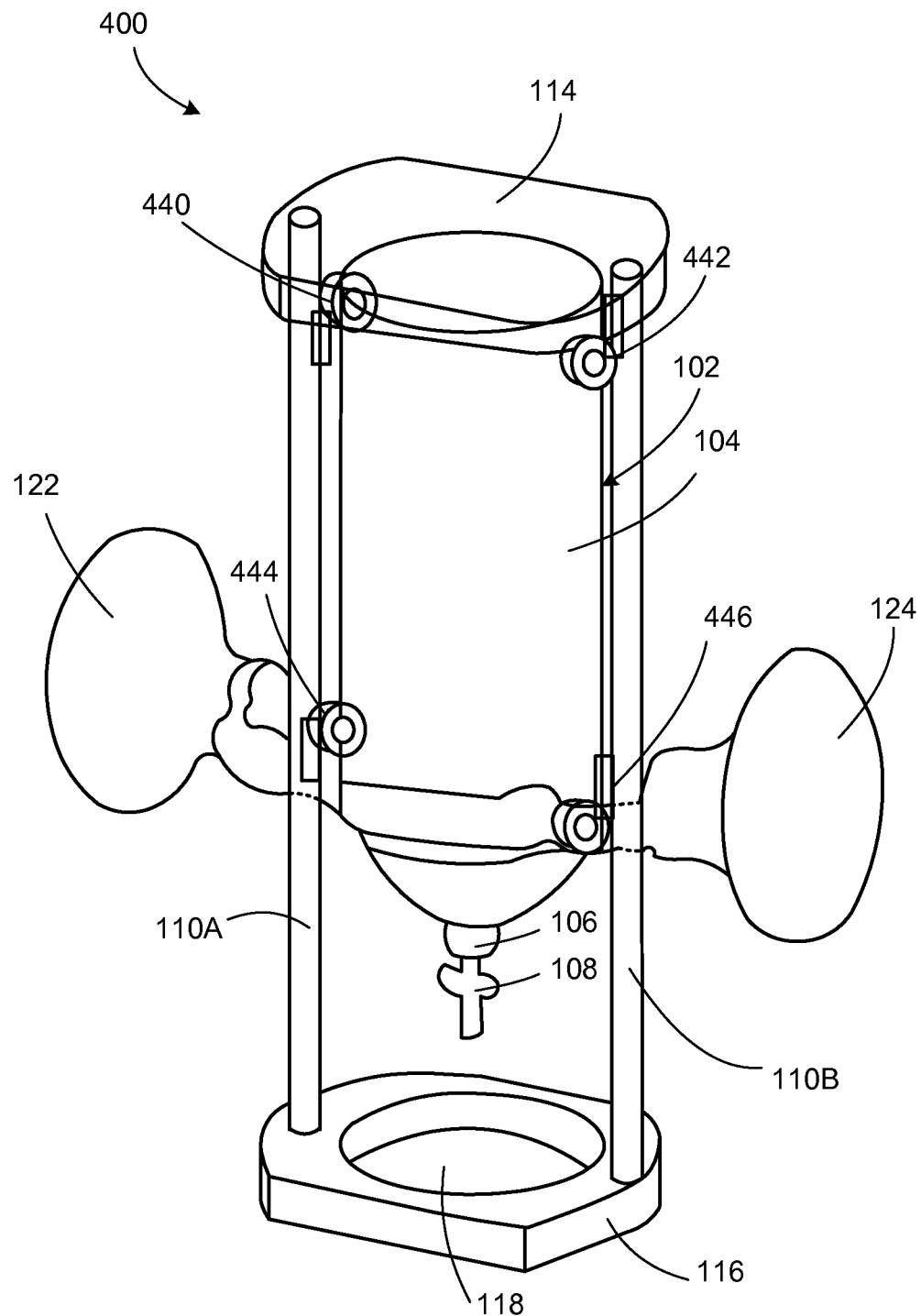
FIG. 4 is an isometric view illustrating an exemplary router.

Referring also to FIG. 4, an exemplary router 400 is illustrated. The router 400 illustrates that a fourth rolling element pair may be used to engage one of the rails. In this exemplary implementation, the router 400 may include some of the same and/or similar elements as the other exemplary router implementations described above.

For example, router 400 may include a motor assembly 102, where the motor assembly 102 includes a motor (not shown), a motor housing 104 and a driven shaft 106 attached to the motor that is configured to impart rotation to a cutting tool 108. Handles 122 and 124 may be attached to the motor assembly 102.

Some portions of a housing for the router 400 are illustrated. Those portions of the housing may include a top member 114 and a base 116 having an aperture 118. The aperture 118 enables the cutting tool 108 to penetrate through the base 116 and to engage a workpiece.

Router 400 also may include rails 110A, 110B. As in the other figures described above, the rail 110A may be parallel to the rail 110B. In this exemplary implementation, router 400 includes four rolling element pairs. The rolling element pair 440 and the rolling element pair 444 may be positioned to engage the rail 110A. The rolling element pair 442 and the rolling element pair 446 may be positioned to engage the rail 110B. Each of the rolling element pairs 440, 442, 444, 446 may be attached to the motor housing 104. Other means for attachment may be used.

In this exemplary implementation, the rolling element pairs 440 and 442 may be in a same horizontal plane and the rolling element pairs 444 and 446 may be in a same horizontal plane that is below the horizontal plane of the rolling element pairs 440 and 442. While the illustrations of router 300 of FIG. 3 and router 400 of FIG. 4 may not be to scale, the use of more than two rolling element pairs engaging the rails 110A and 110B may result in a more compact router assembly than if two pair of rolling element pairs is used. This space savings may result from the fact that the rod and bushing pair on top may not be needed. This may be a height savings equivalent to the stroke of the bearings. In one exemplary implementation, one of the rolling element pairs may contact a separate pair of rails, which may be at a different distance or angular arrangement for compactness purposes.

In one exemplary implementation, the rolling element pairs 440, 442, 444, 446 may be ball bearings, where each of the ball bearings is attached to the motor housing 104. The ball bearing pairs may be positioned such that they engage its respective rail at an angle that enables the desired tolerances to be achieved and at the same time provide a smooth linear traversal motion of the motor assembly 102 along the rails 110A, 110B.

Figure 5:
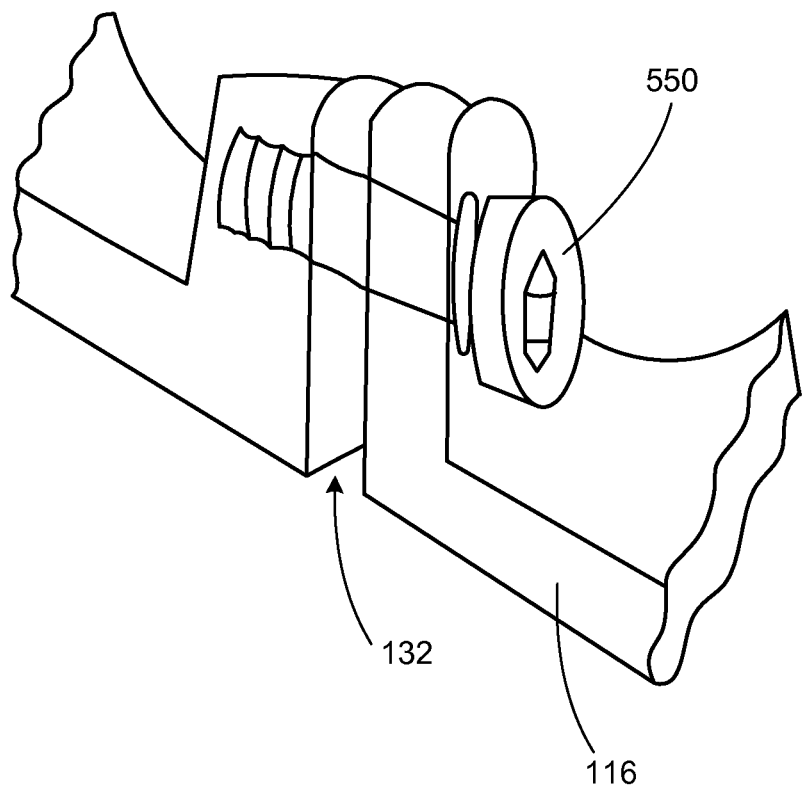
FIG. 5 is an enlarged view illustrating exemplary details of the exemplary router of FIG. 1.

Referring to FIG. 5, an exploded, enlarged illustration of a split housing of FIG. 1 is shown. In FIG. 5, the base 116 is illustrated as being split at point 132. Thus, the base 116 is not a continuous solid piece of frame. Instead, the split housing is secured together by a fastener 550. The split housing may be assembled and secured with the fastener 550 during the manufacturing and assembly process in order to achieve the desired tolerances between the rolling element pairs and the rails, as illustrated above in FIGS. 1-4. A result of the rail and rolling element pair arrangement is that the router can operate without the clearances usually needed in conventional router systems.

In one exemplary implementation, the fastener 550 may not be accessible to an end user and may be covered by a portion of a housing. In this exemplary implementation, the fastener 550 is illustrated as a screw that secures one end of the base to the other end of the base. In other exemplary implementations, different types of fasteners 550 may be used.

Although not illustrated in this enlarged view, the top member 114 also may be a split housing, where the housing is split at a point 134, as described and illustrated above with respect to FIG. 1.

Figure 22A:
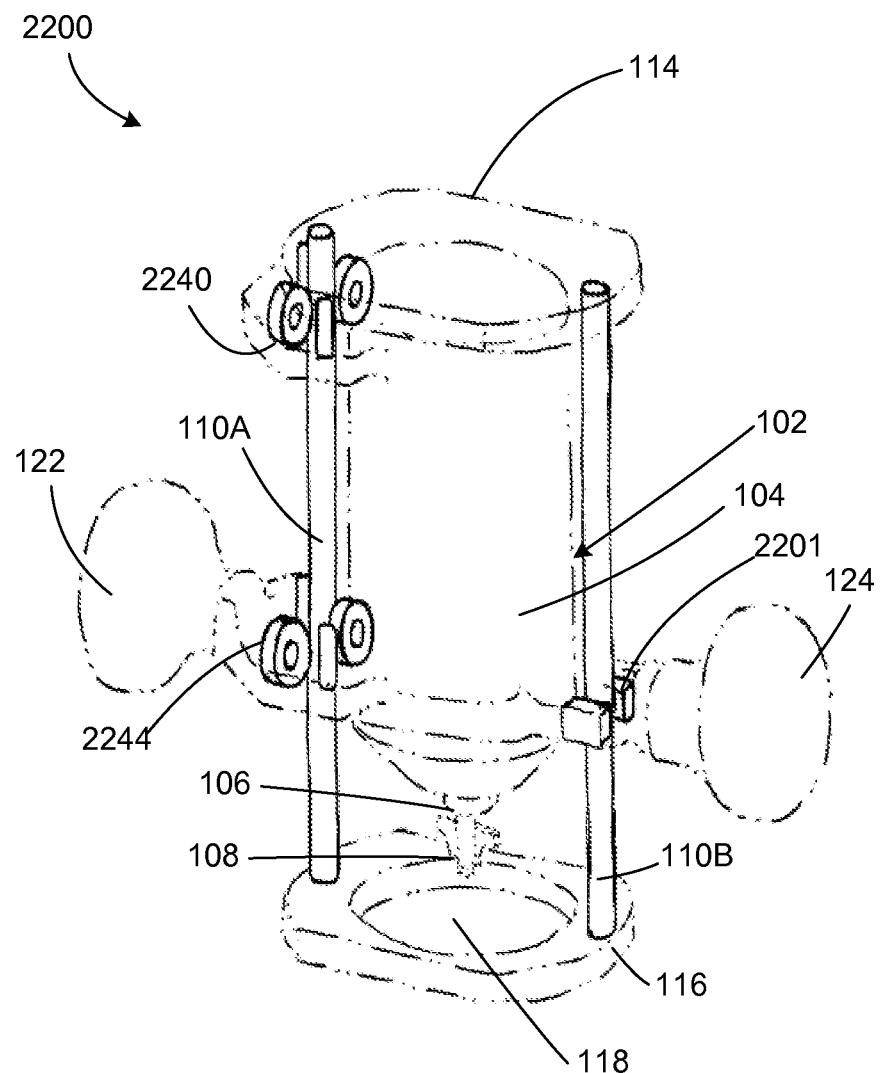
FIG. 22A is an isometric view of an exemplary router.
Figure 22B:
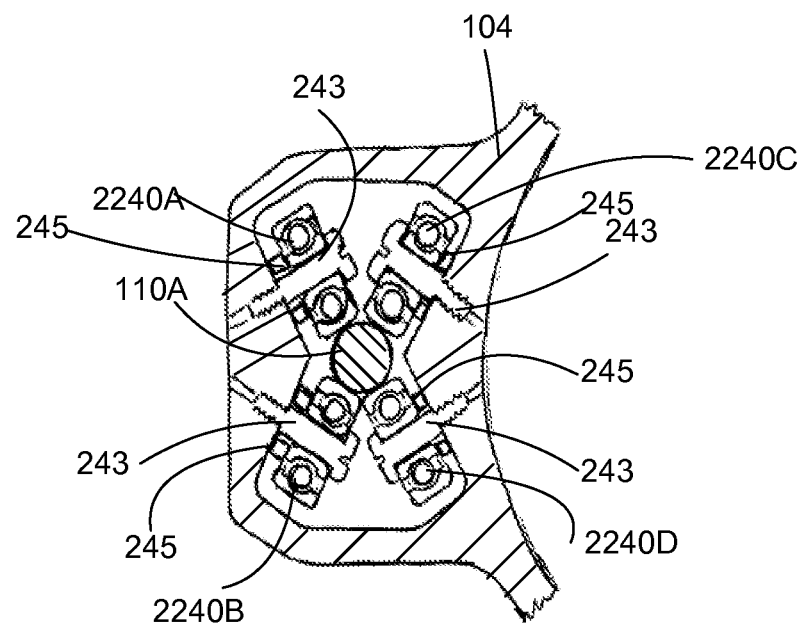
FIG. 22B is a partial, cross-sectional top view of the exemplary router of FIG. 22A.
Figure 22C:
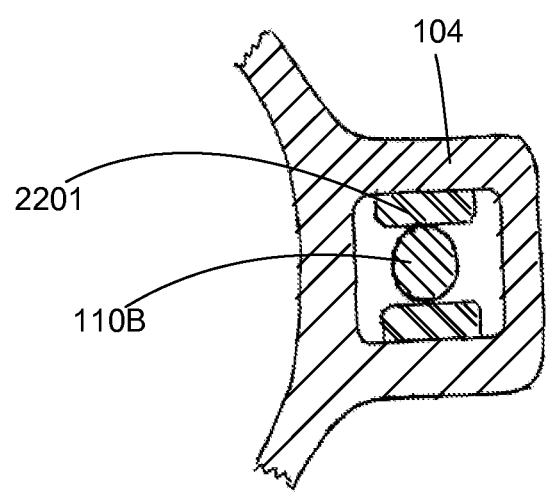
FIG. 22C is a partial, cross-section top view of the exemplary router of FIG. 22A.

In one exemplary implementation, only one of the rails 110A or 110B may be used in conjunction with one or more rolling element pairs. If a second rail is used without any rolling elements pairs, the second rail may be a clocking feature to ensure that the router bit stays in the center of the housing. In other implementations, a second rail may not be needed and other means may be used to implement the clocking feature. Referring to FIGS. 22A-22C, an exemplary router 2200 is illustrated. In FIG. 22A, the router 2200 includes rail 110A in conjunction with rolling element pairs 2240 and 2244. The router 2200 also includes rail 110B; however, there are no rolling element pairs engaged with rail 110B. Instead, the rail 110B is used as a clocking rail. A bushing element 2201 may be positioned to engage the rail 110B.

Referring also to FIG. 22B, a partial, cross-sectional top view of the rail 110A, the motor housing 104 and the rolling element pair 2240 are illustrated. In this exemplary implementation, the rolling element pair 2240 includes four ball bearings 2240A, 2240B, 2240C and 2240D. The ball bearings 2240A-2240D may be secured to the motor housing 104 using washers 245 and fasteners 243. The ball bearings 2240A-2240D may be positioned in such a manner that they engage the rail 110A at an angle and enable smooth, linear movement of the motor assembly 102.

Referring also to FIG. 22C, a partial, cross-sectional top view of the rail 110B, the motor housing 104 and the bushing 2201 are illustrated. In this exemplary implementation, the bushing 2201 is attached or integrated within a sleeve of the motor housing 104. The bushing 2201 is configured to traverse along the rail 110B. In this manner, the rail 110B provides a clocking feature to the router 2200.

Referring to FIG. 6, the router 100 is illustrated with the motor assembly 102 being in a plunge position. The motor assembly 102 is illustrated as being driven axially downward towards the base 116 such that the motor assembly 102, with its attached rolling element pairs (not shown in this figure), traverse along rails 110A, 110B. The router 100 also includes the biasing members 126 and 128, which are illustrated in an extended position.

As discussed above with respect to FIG. 1, when the motor assembly 102 is in a downward position, the biasing members 126, 128 unroll and extend along with the motor assembly 102. The biasing members 126, 128 may be attached to a portion of the housing 112. For example, the biasing members 126, 128 may be attached to sidewalls 120 and/or the top member 114. The other end of the biasing members 126, 128 may be attached to the motor assembly 102. For instance, the biasing members 126, 128 may be attached to a top of the motor housing 104. Although biasing members 126 and 128 are illustrated as rolled springs, other types of biasing members may be used. For example, the biasing members may be extension springs, compression springs, torsion springs, elastic members such as rubber or latex cords, air springs or magnets.

In this illustration, the router 100 also includes a bushing 130 and shaft 131. The shaft 131 may be secured to the top member 114 and the bushing 130 may be secured to the motor assembly 102. The bushing 130 includes a concentric bore through which the shaft 131 may slidably penetrate. The bushing 130 and the shaft 131 may enable the motor assembly 102 to travel along the shaft 131 in a downward and upward position. The shaft 131 and bushing 130 are optional and also may assist in guiding the motor assembly 102 toward the top member 114. When the motor assembly 102 is in a downward plunge position, the bushing 130 is illustrated in an extended position along a shaft 131. In other exemplary implementations, the shaft 131 may be fixed to the motor assembly 102 and the bushing 130 may be fixed to the top member 114.

In the example implementations discussed above, the rolling element pairs may be examples of means for slidably engaging the motor assembly along the rails 110A, 110B. Each of the rolling element pairs, as discussed above, may include a pair of ball bearings that are attached to the motor assembly 102 and positioned to engage the rail at a desired angle. Other types of means may be used to engage the motor assembly with the rails 110A and 110B. For instance, the means for slidably engaging the motor assembly 102 with the rails 110A, 110B may be other types of rolling element bearings such as cylindrical roller bearings, tapered roller bearings, needle bearings, or other types of bearings. In another implementation, the means for slidably engaging the motor assembly 102 with the rails 110A, 110B may instead be sliding elements such as, for example, wear pads made of a material such as acetal, ultra high molecular weight polyethylene (UHMW), brass, bronze or other materials. In other exemplary implementations, different combinations of the means for slidably engaging the motor assembly 102 with the rails 110A, 110B may be used together in the same router, with one type of means for slidably engaging the motor assembly on one rail and another type of means for slidably engaging the motor assembly 102 on another rail.

The means for slidably engaging the motor assembly 102 with the rails 110A, 110B may include multiple pairs of rolling elements including two pairs as described and illustrated in FIG. 2, three pairs as described and illustrated in FIG. 3 and four pairs as described and illustrated in FIG. 4. The three pairs of rolling element pairs may be arranged in different configurations including two of the pairs in a same plane and a third pair either above or below the plane of the other two. Alternatively, the three rolling element pairs may be arranged in a triangle fashion with two members on one of the rails and a third member on the second rail in a position to form a triangle with the other two pairs. In this manner, each of the pairs is on a separate horizontal plane in relation to the base 116 or the top member 114.

Similarly, the four rolling element pairs, as illustrated in FIG. 4, may be in two or more different horizontal planes. For instance, two of the rolling element pairs may be in a same horizontal plane and the other two rolling element pairs may be in a same plane, thus resulting in two different planes being used. Alternatively, one of the rolling element member pairs may be offset and in a third horizontal plane. Alternatively, a fourth rolling element pair may be offset and in a fourth horizontal plane.

Figure 7:
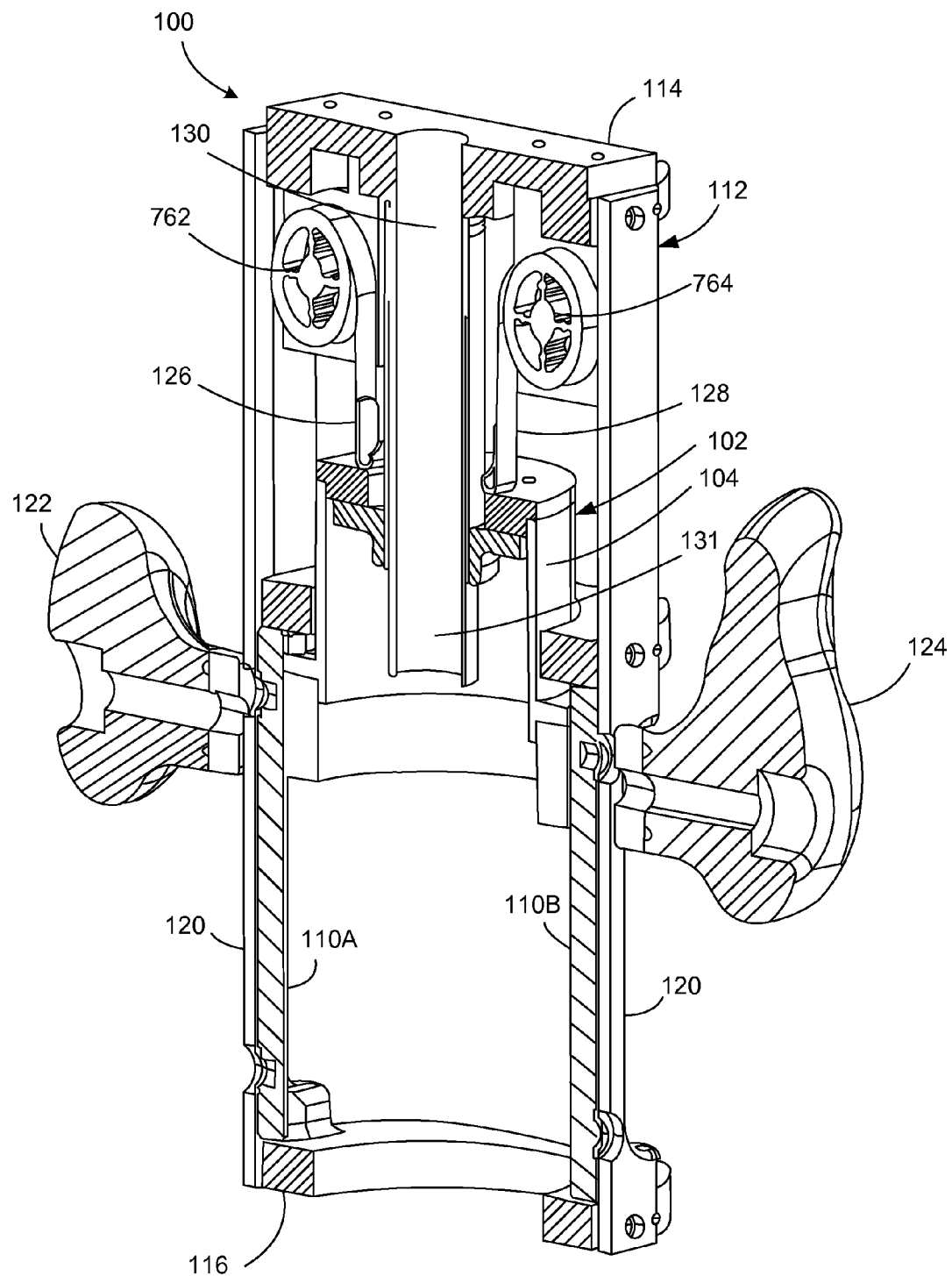
FIG. 7 is a cross-sectional isometric view illustrating the exemplary router of FIG. 1.

Referring to FIG. 7, a cross-sectional, isometric view of the router 100 of FIG. 1 is illustrated, where the motor assembly is in a biased-up towards the top member 114. FIG. 7 illustrates the same or similar elements as illustrated in FIG. 1.

The router 100 includes a motor assembly 102, where the motor assembly includes a motor housing 104. In FIG. 7, the motor, motor shaft, and other router components including the cutting tool are not illustrated for the sake of simplicity. The motor assembly 102 is disposed within a housing 112. The housing 112 includes a top member 114, a base 116 and sidewalls 120. Handles 122 and 124 may be attached to the motor assembly 102 to enable a user to traverse the motor assembly 102 in an axial direction towards the base 116.

The router 100 may include rails 110A, 110B. As illustrated in FIG. 7, the rails 110A, 110B may extend from the base 116 to halfway towards the top member 114. In other exemplary implementations, the rails 110A, 110B may be of varying lengths and extend along the sidewalls 120 from the base 116 to different points along the sidewalls 120. In some implementations, the rails 110A, 110B may extend the entire length of the sidewalls 120. As discussed above with respect to FIGS. 1-6, the rolling element pairs may be used to enable the motor assembly 102 to traverse in an axial direction along the rails 110A, 110B. In this illustration of FIG. 7, the rolling element pairs are not illustrated.

The router 100 also may include one or more biasing members. In this exemplary implementation, two biasing members 126 and 128 are illustrated. The biasing members 126 and 128 may be rolling springs that are configured to roll and store around spools 762 and 764, respectively. The biasing members 126 and 128 may be configured to bias the motor assembly 102 towards the top member 114. The biasing members 126 and 128 may be attached to a top of the motor housing 104. In this example, the biasing members 126 and 128 are illustrated as hooking around an engagement point on the top of the motor housing 104. In one implementation, the biasing members 128 and 128 may be mounted to the top of the motor housing 104.

The router 100 also includes a bushing 130 and a shaft 131. The bushing 130 is a cylindrical bushing having a bore that surrounds the shaft 131. The bushing 130 and shaft 131 may assist the motor assembly 102 in providing a smooth and linear movement as it is traversed along the rails 110A, 110B. In some exemplary implementations, the bushing 130 and shaft 131 may be used in conjunction with the rolling element pairs. In other exemplary implementations, the bushing 130 and shaft 131 may be omitted. For example, multiple rolling element members may be used in place of the bushing 130 and shaft 131.

Figure 8:
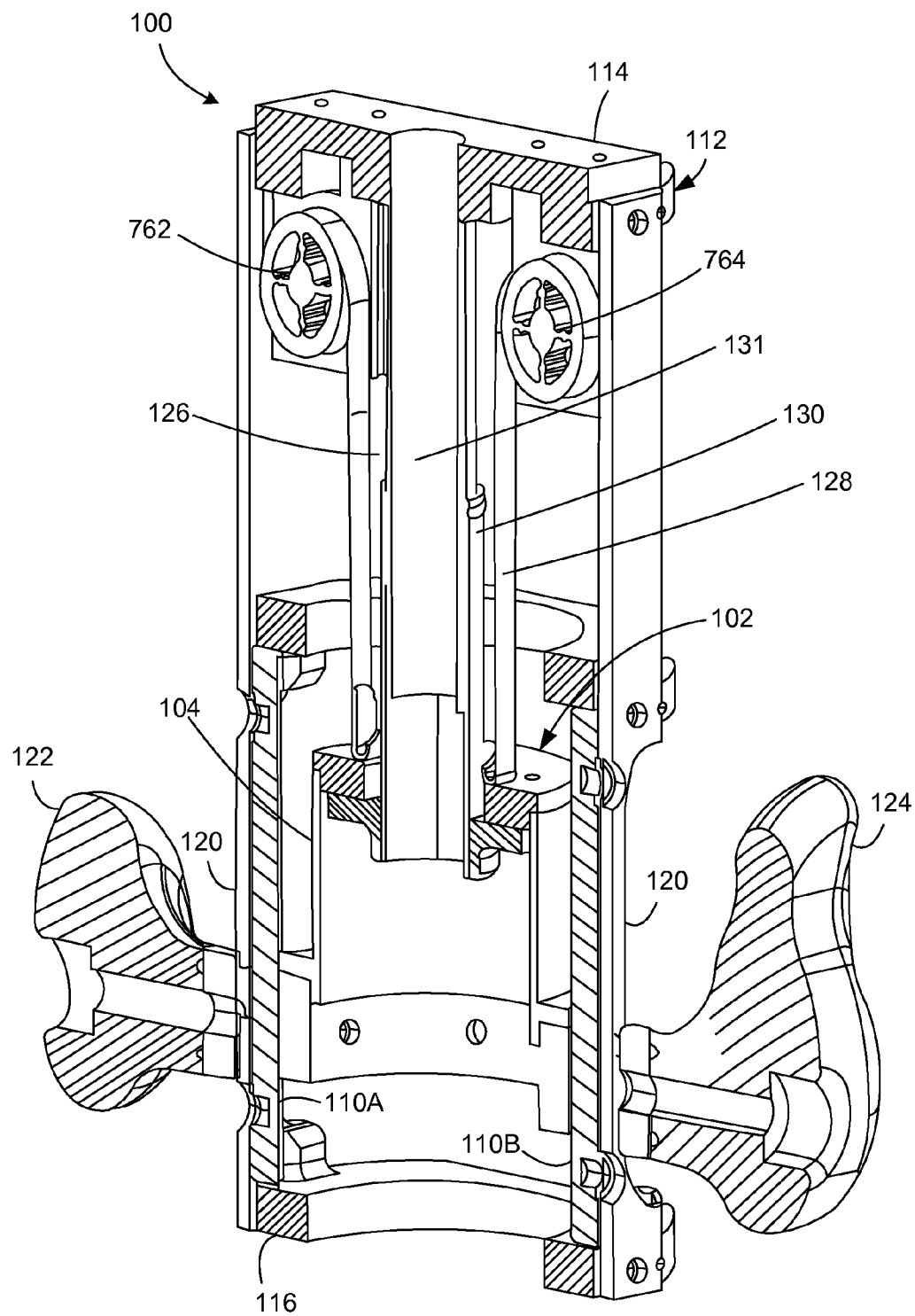
FIG. 8 is a cross-sectional isometric view illustrating the exemplary router of FIG. 6.

Referring to FIG. 8, the router 100 is illustrated as a cross-sectional, isometric view, where the motor assembly 102 is in a downward position towards the base 116. The elements as illustrated in FIG. 8 are the same as or similar to those illustrated in FIG. 7. As illustrated in FIG. 8, the biasing members 126 and 128 are shown in an unrolled and extended position. The biasing members 126 and 128 unroll from the spools 762 and 764. In a similar manner, the bushing 130 has extended along the shaft 131. The shaft 131 may be attached and secured to the top member 114. The bushing 130 may be secured in a bore in the top of the motor assembly 102. The bushing 130 and the shaft 131 may engage in an axial, slidable relationship to enable the inner surface of the bushing 130 to traverse along the outer surface of the shaft 131 as the motor assembly 102 is traversed along the rails 110A, 110B.

Throughout this document, the term housing, for example, housing 112, also may be referred to as a frame interchangeably. The housing 112 as illustrated in FIGS. 1-8 may be fixed in size. In this manner, the fixed size may refer to the sidewalls 120 having a fixed length or the overall length of the housing as measured from the top member 114 to the base 116. The walls 120 may be a single piece of material or may be multiple pieces of material that are attached together to form the sidewall. In either case, the length of the sidewalls 120 may be fixed as measured between the base 116 and the top member 114. In this manner, the motor assembly 102 is constrained within the housing 112 and its traversal up and down is constrained such that the motor assembly 102 may not extend beyond the top member 114 and may only extend beyond the base member 116 as far as the cutting tool 108 extends through aperture 118 in the base 116. Other exemplary implementations within the scope of FIGS. 1-8 may not include a housing that is fixed in size.

Figure 9:
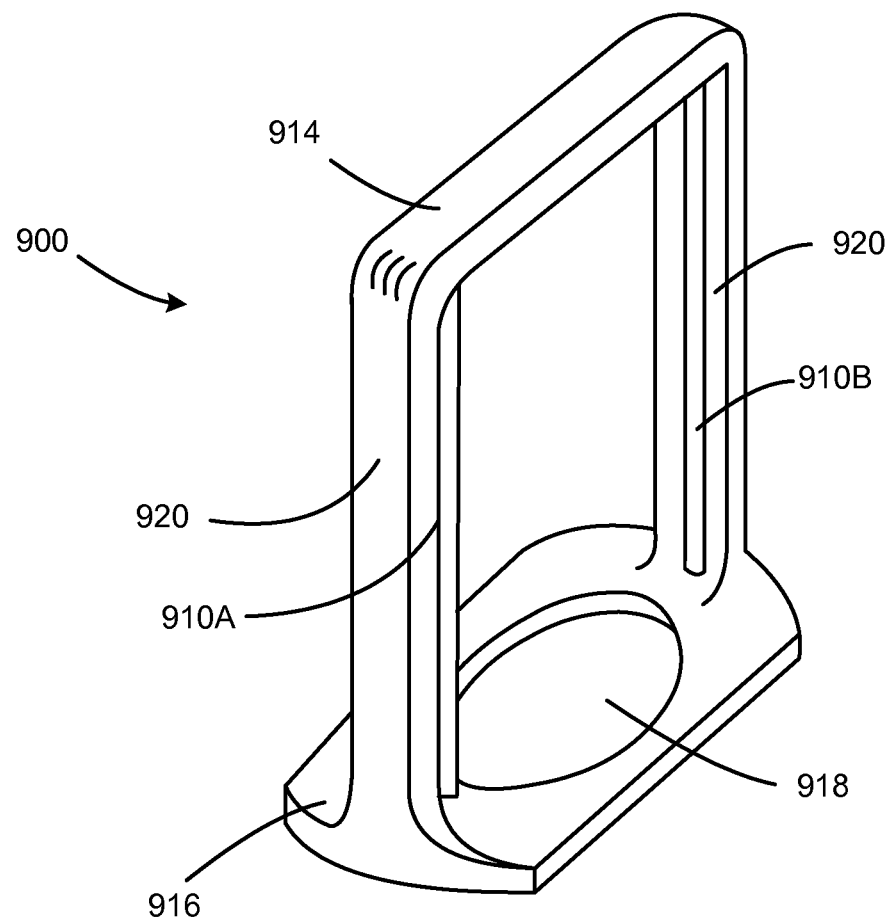
FIG. 9 is an isometric view illustrating an exemplary router frame or housing having a closed frame with a fixed height.

Referring to FIG. 9, an exemplary router frame 900 is illustrated. The router frame 900 may include a top member 914, a base 916 having an aperture 918, and sidewalls 920. Although illustrated as a single form in FIG. 9, the router frame 900 and its components may be separate components that are configured to be attached to form the frame. The router frame 900 is exemplary in nature and is not dimensioned to a particular size. The exemplary router frame 900 illustrates that the frame size may be fixed such that the height of the router frame as measured from the base 916 to the top member 914 is a fixed length. In this manner, a motor assembly is constrained within the fixed height of the router frame 900. The router frame 900 may be a closed frame with a fixed height.

The router frame 900 also illustrates rails 910A and 910B. The rails 910A and 910B may be the same as the rails 110A, 110B, as illustrated in FIGS. 1-8. Similarly, the router frame 900 and its components may be similar or the same as the components for the router housing 112 and its components as illustrated in FIGS. 1-8. A motor assembly that is constrained within the router frame 900 may traverse in an axial direction along the rails 910A and 910B, as described above with respect to FIGS. 1-8.

Figure 10:
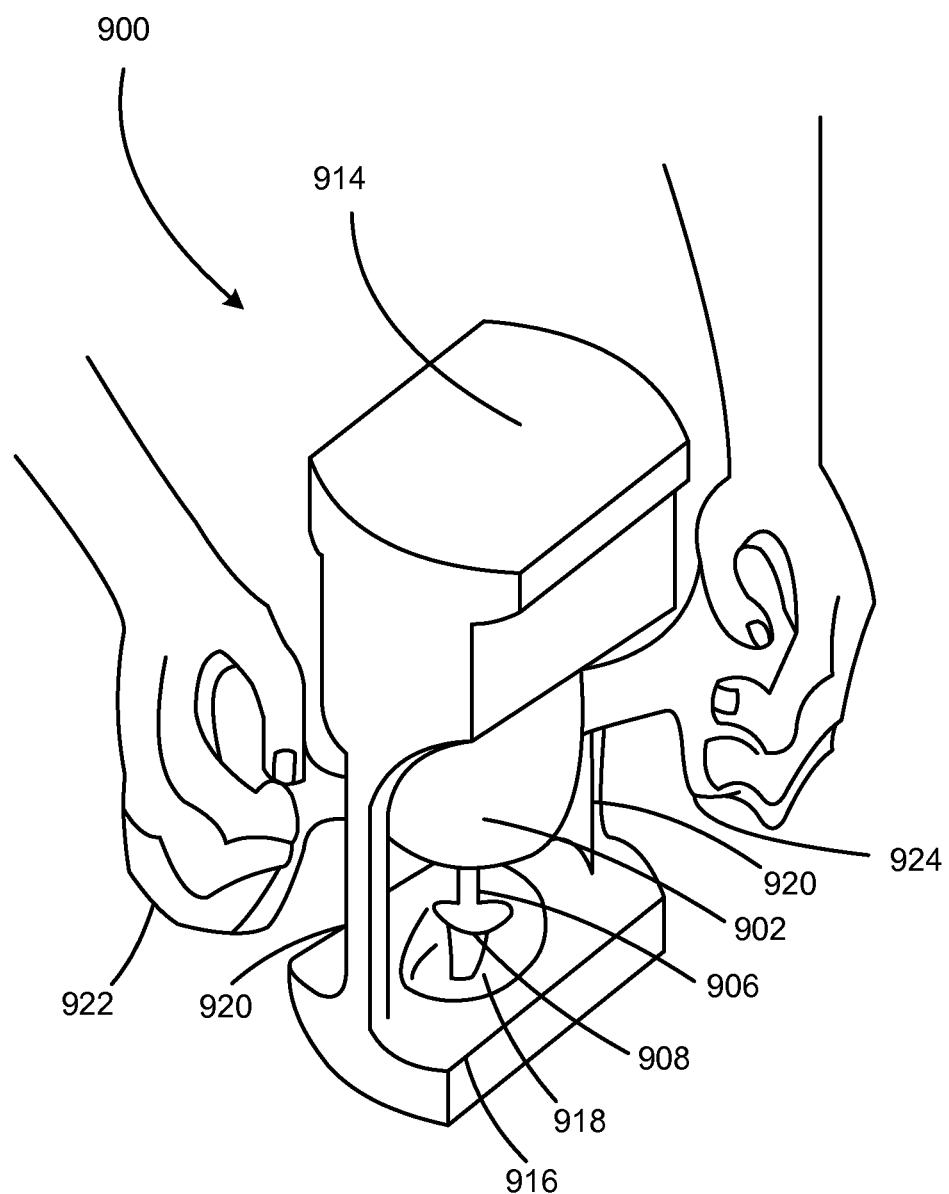
FIG. 10 is an isometric view illustrating an exemplary router having a closed frame with a fixed height frame or housing.

A benefit of router frame 900 is that the height of the router is unchanged. For example, when compared to other conventional plunge routers, those plunge routers may have varying frame heights, where the height of the frame may vary during operation of the router. Referring also to FIG. 10, the router frame 900 is illustrated with a router disposed within the frame 900. The router frame 900 includes a top member 914, a base 916 having an aperture 918 and sidewalls 920. The router may include a motor assembly 902, which imparts rotation to a shaft 906 and a cutting tool 908.

Although not illustrated in FIG. 10, the router may be configured to traverse along a length of the sidewalls 920, for example, using rails and rolling element pairs, as described above with respect to FIGS. 1-8. The router also may include handles 922 and 924, where the handles 922, 924 are attached to the motor assembly 902. The handles 922 and 924 enable a user to comfortably grip the router and to operate the router as illustrated in FIG. 10. As can be seen from this example, the area around the base 916 is free from obstructions and provides good visibility for a user to observe the workpiece and the router as it engages the workpiece. The router frame 900 may be referred to as "closed frame", which may be lighter, stiffer and more accurate than a conventional plunge router frame in which the bearing rods are typically cantilevered.

Figure 11:
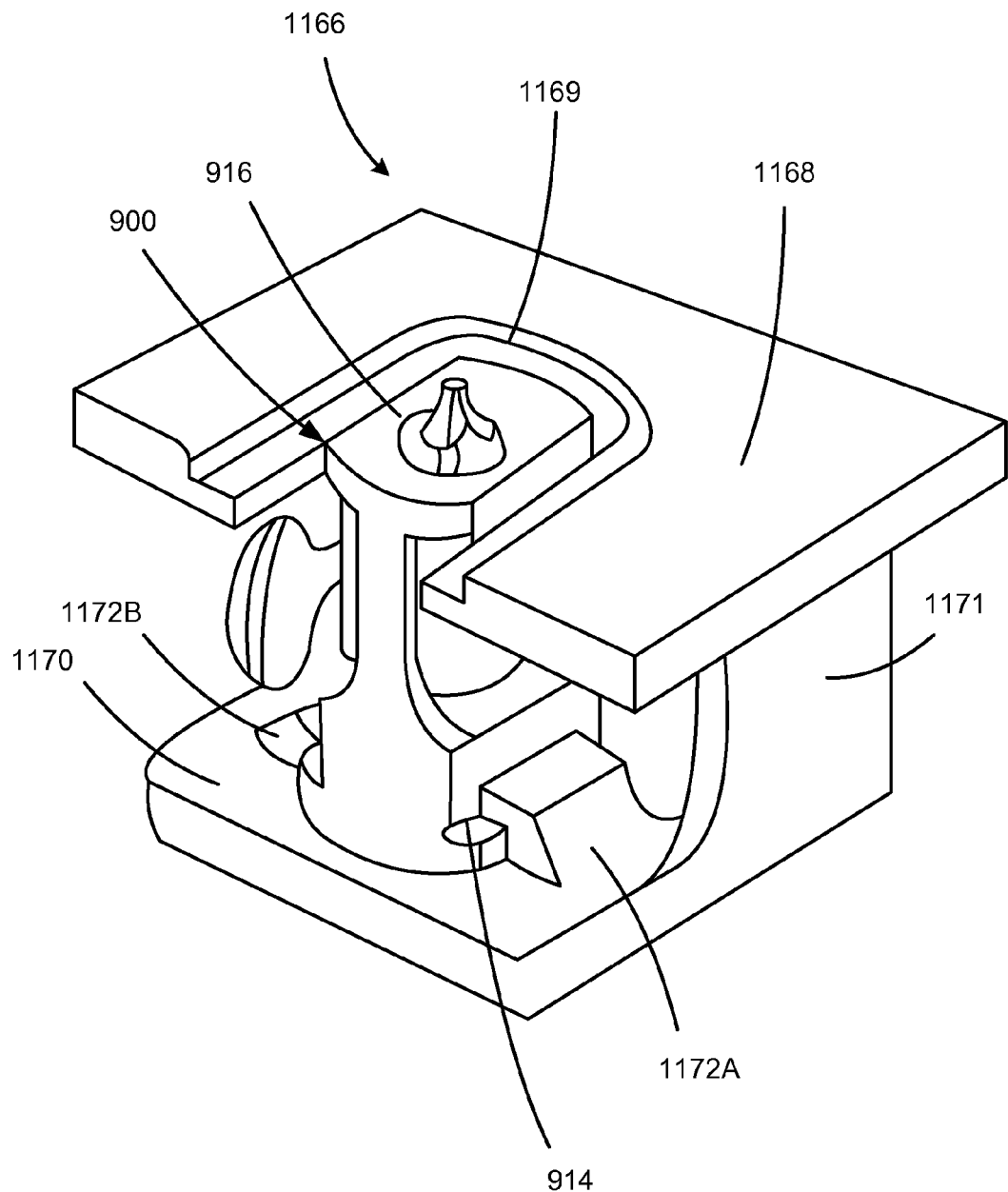
FIG. 11 is an isometric view illustrating the exemplary router of FIG. 10 being used in an exemplary router table.

Referring also to FIG. 11, the router frame 900 is illustrated as being secured in a router table 1166. A benefit of the router frame 900 is that the fixed-height frame may be used for mounting in a router table such that the router may be used as a stationary router. Because the height of the router frame 900 remains unchanged, the router table 1166 also may be fixed in size in relation to the top surface and the bottom surface of the router table 1166. The router itself may be adjusted and moved in an axial direction within the frame 900.

The router table 1166 may include a top surface 1168 being configured and shaped to have a cutout opening 1169 to enable the base of the router frame 916 to be flush or nearly flush with the top surface 1168. Router table 1166 also includes a bottom surface 1170. The bottom surface 1170 may include means for securing the router frame 900 within the router table 1166. In this manner, the bottom surface 1170 may support the weight of the router. In contrast, a conventional router table may need more structure to support the weight of the router because the router may be secured or hung in the top surface.

In one exemplary implementation, the bottom surface 1170 may include one or more engagement members 1172A and 1172B to engage a top surface 914 of the router frame 900. In this exemplary illustration, the engagement members 1172A and 1172B are illustrated as legs having an L-shape such that the top surface 914 may slide under the shape of the engagement members 1172A and 1172B. The top surface 914 may be configured such that the tolerance clearance and thickness of the top member 914 securely engages under the engagement members 1172A and 1172B. In other exemplary implementations, other engagement members may be used to secure the top surface 914 into the router table 1166.

The router table 1166 also includes one or more side members 1171 that support the top surface 1168 in relation to the bottom surface 1170. In one exemplary implementation, the side members 1171 may be a fixed height. In other exemplary implementations, the side members may be configured to extend such that the top surface 1168 may be raised or lowered in relation to the bottom surface 1170.

Figure 12:
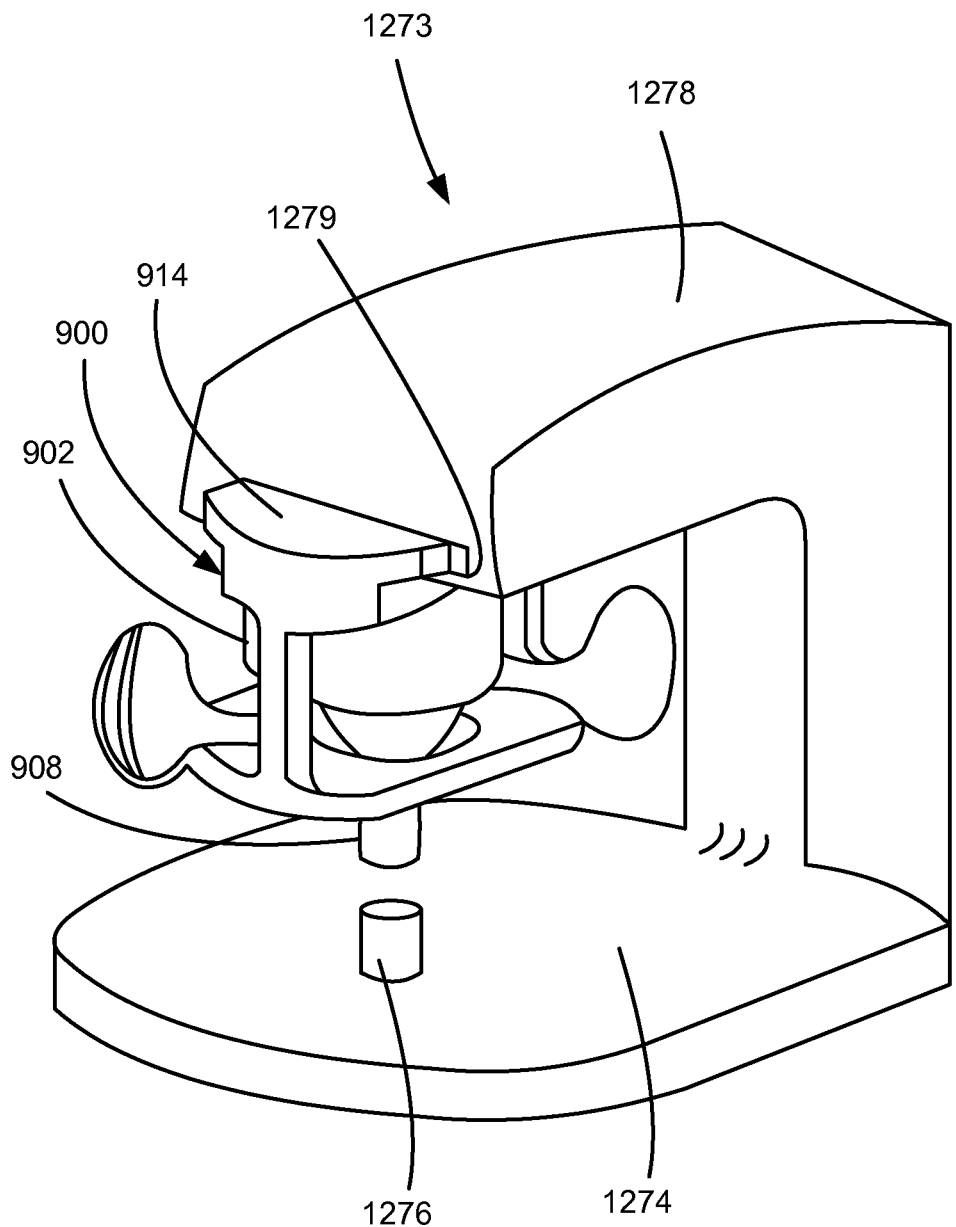
FIG. 12 is an isometric view illustrating the exemplary router of FIG. 10 being used in an exemplary pin router frame.

Referring to FIG. 12, the router frame 900 is illustrated as being mounted in a pin router frame 1273. The fixed height feature of the router frame 900 enables the router to be used in multiple different mountings. As illustrated previously in FIG. 11, the router frame 900 may be used in a router table 1166. In FIG. 12, the router frame 900 is illustrated as being mounted in the pin router frame 1273.

The pin router frame 1273 may include a base member 1274 having a pin 1276. The pin 1276 may be secured to the base member 1274. The pin router frame 1273 may include an arm member 1278 that is connected to the base member 1274. In this exemplary implementation, the arm member 1278 and the base member 1274 are illustrated as a solid piece. In other exemplary implementations, the arm member 1278 and the base member 1274 may be separate components that are configured to be secured together. Each of the base member 1274 and the arm member 1278 also may include multiple components to form the base member and the arm member.

The arm member 1278 may be configured to receive the router frame 900. In one exemplary implementation, the arm member 1278 includes means for securing the router frame 900 in the arm 1278. The router frame 900 may be secured and positioned such that the cutting tool 908 aligns over top of the pin 1276. The router motor assembly 902 may be configured to traverse within the frame 900 in an axial position such that it traverses upward and downward. Thus, an operator may traverse the router motor assembly 902 to move the cutting tool 908 towards the pin 1276 to engage a workpiece (not shown).

In one exemplary implementation, the means to secure the router frame 900 within the arm 1278 may include integrated tracks 1279 to create an opening slot within the arm member 1278 such that the top member 914 slidably engages into the opening of the arm 1278 along the tracks 1279. In other exemplary implementations, other means may be used to secure the router frame within the pin router frame 1273.

Figure 13:
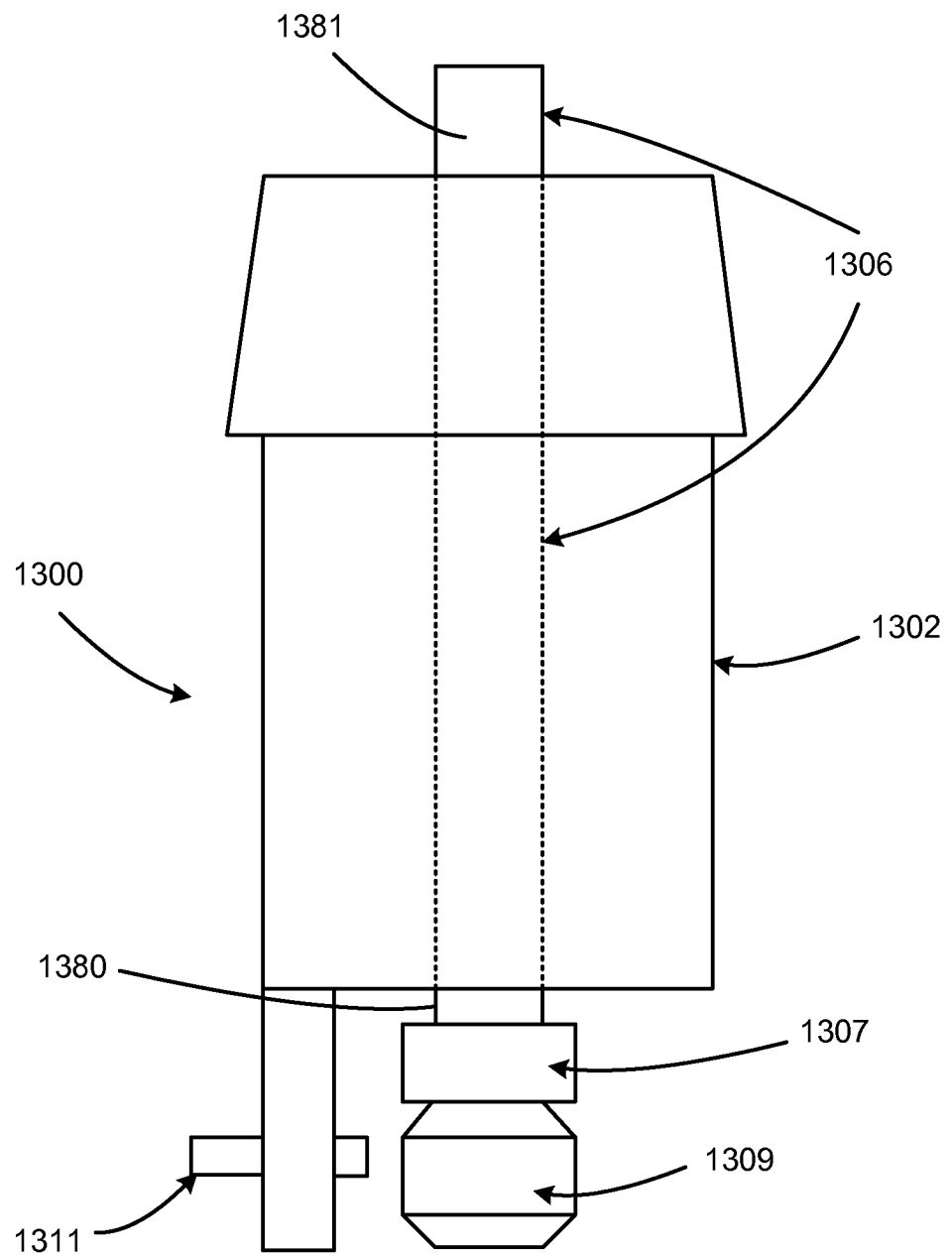
FIG. 13 is a block diagram illustrating an exemplary router having an exemplary collet locking mechanism.

Referring to FIG. 13, a router 1300 may include a motor assembly 1302, where the motor assembly is configured to impart rotation to a shaft 1306. A bottom end of the shaft 1380 may include an arbor 1307 and a collet nut 1309. The arbor 1307 also may be referred to as a spindle. The collet nut 1309 may include a bore through the center of the collet nut where the bore includes internal threads that are configured to engage external threads on the shaft 1306. Rotation of the collet nut forces a collet (not shown) to either loosen or tighten.

The collet may be configured to mate into a cavity bored into the bottom end of the shaft 1380. The collet is configured to grip a shank of a cutting tool. Typically, the router operation requires that router bit shanks be tightly gripped by the collet. Generally to loosen or tighten the collet, a user must use two wrenches or may use an arbor lock and a wrench. In either case, with both wrenches or a single wrench and an arbor lock, the wrenches are used at the base of the router where there is not a lot of room to operate to loosen and tighten the collet.

In this exemplary implementation, the router 1300 includes a locking mechanism 1311. The locking mechanism 1311 is configured to engage the collet nut 1309 to prevent rotation of the collet nut. In this manner, a user may loosen or tighten the collet by using an implement at the upper end of the shaft 1381. The locking mechanism 1311 prevents rotation of the collet nut 1309. Rotation at the other end 1381 of the shaft 1306 causes the arbor to rotate, which thus tightens and loosens the connection to the collet.

The locking mechanism 1311 may be implemented in various ways. In one exemplary implementation, the collet nut 1309 may include a hole in a side of the nut and the locking mechanism 1311 may be a pin that is configured to engage and disengage with the hole in the collet nut 1309. When the pin is engaged in the hole, the collet nut 1309 is prevented from rotating. When the pin is disengaged from the hole, the router and collet may operate as normal. The locking mechanism 1311 may include an arm that is configured to pivot such that it engages and disengages the locking mechanism, such as a pin, with the collet nut 1309. Other types of locking mechanisms 1311 also may be used.

In another exemplary implementation, the locking mechanism may be an implement that is shaped like a wrench and that is configured to engage and disengage the outside of the collet nut 1309. The shape of the wrench may be configured to mate with the outer shape of the collet nut 1309 such that when the wrench is engaged the collet nut 1309 is prevented from rotating. In this manner, a user may loosen or tighten the collet by using an implement at the upper end of the shaft 1381.

In one exemplary implementation, the shaft 1306 may extend beyond the housing of the router 1300, as illustrated in FIG. 13. In this exemplary implementation, a user may use a wrench to rotate the exposed part of the shaft 1306 at the upper end 1381. When the locking mechanism 1311 is engaged, the rotation of the shaft 1306 at the upper end 1381 causes the collet to be tightened or loosened depending on the direction of rotation of the shaft.

In another exemplary implementation, the shaft 1306 may not extend beyond the router housing. In this case, the upper end of the shaft 1381 may be recessed into the motor housing and may include a cavity in the upper end 1381. A tool such as a socket wrench or a hex wrench may then be inserted into the cavity. A corresponding shape in the end of the shaft would mate up with the inserted tool and enable rotation of the shaft 1306. When the locking mechanism 1311 is engaged with the collet nut 1309, the rotation of the shaft 1306 causes the tightening or loosening of the collet depending on the direction of rotation of the shaft. Other types of implements may be used to rotate the upper end of the shaft 1381 including, for example, a ratcheting wrench.

In the various manners described, a single wrench may be used in combination with the locking mechanism 1311 to enable the user to change cutting tools from the router. The locking mechanism 1311 may be engaged with the collet nut 1309 without the user having to keep it pressed in. Thus, the user may engage the locking mechanism 1311 and then be free to use both hands to use an implement to rotate the shaft at the upper end 1381 to change out router bits.

In another exemplary implementation, the locking mechanism 1311 may be operably coupled to a switch mechanism. The switch mechanism may be used to prevent the router motor from turning on when the locking mechanism 1311 is engaged with the collet nut 1309. When the locking mechanism 1311 is disengaged from the collet nut 1309, the switch mechanism would be configured to enable normal operation of the motor. In this manner, the locking mechanism and combined switch mechanism may be used to prevent the motor from turning on when the user is in the process of changing router bits.

Figure 14:
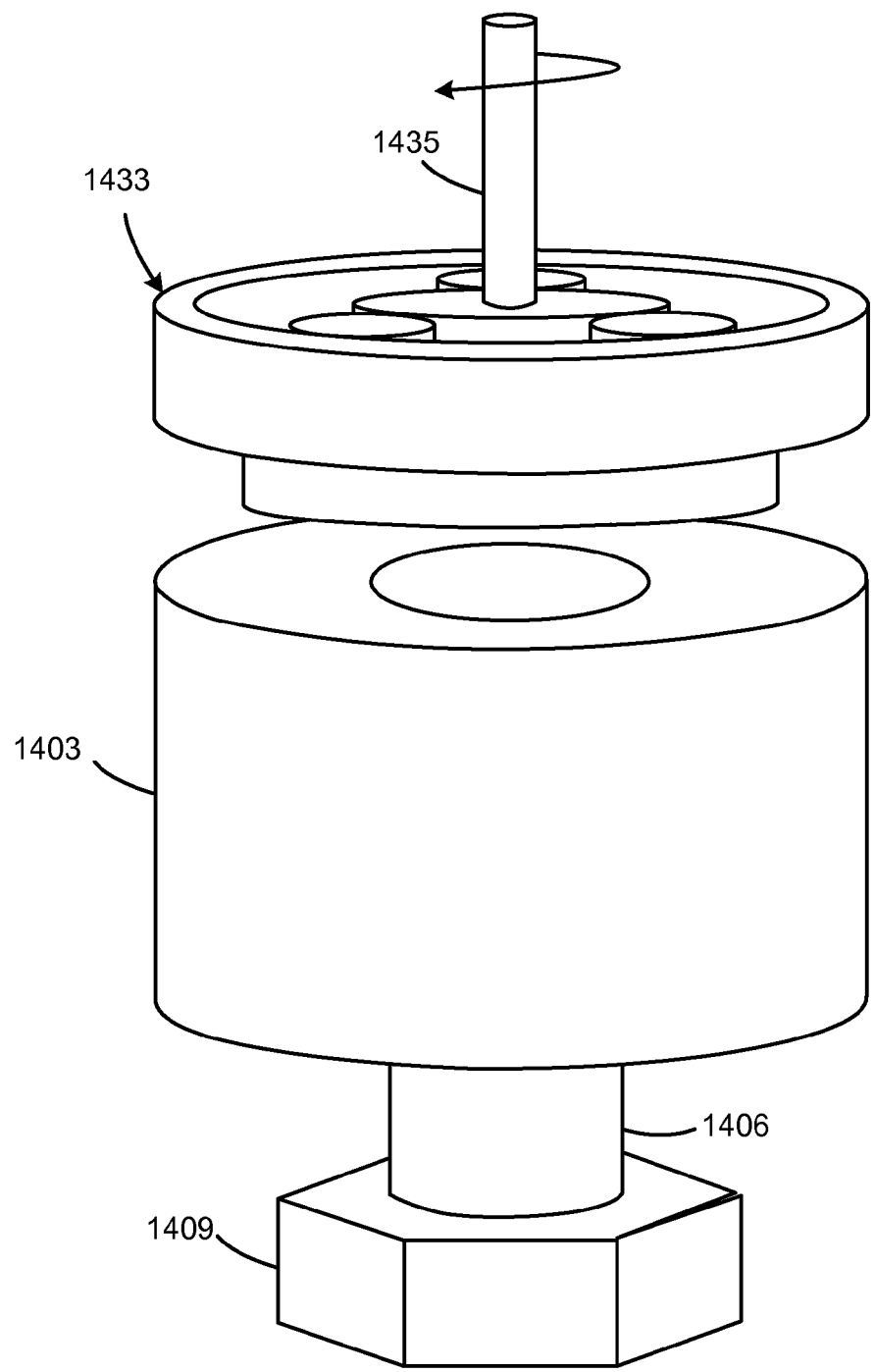
FIG. 14 is a block diagram illustrating an exemplary router assembly and gear mechanism.

Referring to FIG. 14, a portion of a router assembly is illustrated. In this exemplary illustration, a gear train may be coupled and decoupled with an armature of the router motor assembly to enable a user to change router bits more easily. In this manner, a user may be able to change router bits without having to use any tools. The use of a gear mechanism may provide the increased torque which would otherwise have to be provided by a long lever arm of a wrench. By providing the necessary torque using the gear mechanism, the need for the long lever arm of the wrench may be eliminated.

FIG. 14 illustrates a portion of a router assembly that includes an armature 1403, a shaft 1406 and a collet nut 1409. The armature 1403 is a part of a motor assembly (not shown in this illustration). The armature 1403 in conjunction with the other components of the motor assembly provide rotational motion of the shaft 1406. The shaft 1406 may be referred to as a driven shaft. The driven shaft 1406 may include a cavity at one end of the driven shaft. The cavity (not shown) may be configured to receive a collet (not shown), where the collet is configured to retain a shank of a router bit. The collet nut 1409 may include a bore through the center of the nut having internal threads on the bore. The driven shaft 1406 may include external threads on the end of the shaft having the cavity. The internal threads of the collet nut 1409 may be configured to mate with the external threads of the driven shaft 1406. When the collet nut is threaded onto the driven shaft 1406 the router bit shank may be tightened and loosened within the collet.

The other end of the shaft 1406 may be configured to couple with a gear mechanism 1433. The gear mechanism 1433 may be configured to couple and decouple with the motor assembly. Specifically, the gear mechanism 1433 may be configured to couple and decouple with the armature 1403. The gear mechanism 1433 may include different types of gearing systems that enable a user to couple the gear mechanism 1433 with the armature 1403 and to gain a torque advantage without the use of tools to loosen and tighten the collet to remove and secure router bits without the use of tools. This may be achieved when the collet nut 1409 is grounded, meaning that the collet nut 1409 is prevented from rotating.

The collet nut 1409 may be prevented from rotating in different ways. For example, the collet nut 1409 may be grounded through the use of a tool that secures around the outside of the collet nut 1409 to prevent it from rotating. Alternatively, the collet nut 1409 may be grounded through the use of a locking mechanism such as, for example, the locking mechanism 1311 described above with respect to FIG. 13. When the collet nut 1409 is grounded, the rotation of the gear mechanism 1433, when it is coupled to the armature 1403, operates to tighten or loosen the collet depending on the direction of rotation of the gear mechanism 1433.

In one exemplary implementation, the gear mechanism 1433 may include a shaft 1435. The shaft 1435 may be used in a number of different ways. For example, the shaft 1435 may be connected to the gears within the gear mechanism 1433. The shaft 1435 may enable a user to couple and decouple the gear mechanism 1433 with the armature 1403. The shaft 1435 also may be used to enable a user to grip and rotate the gear mechanism in either direction to loosen or tighten the collet and thus change out router bits without using tools. Although illustrated in FIG. 14 as a cylindrical shaft, the shaft 1435 may be shaped in different ways and also may be sized in different ways to enable easy operation including coupling and decoupling of the gear mechanism 1433 to the armature 1403, as well as easy rotation of the gear mechanism when in a coupled state.

Figure 15:
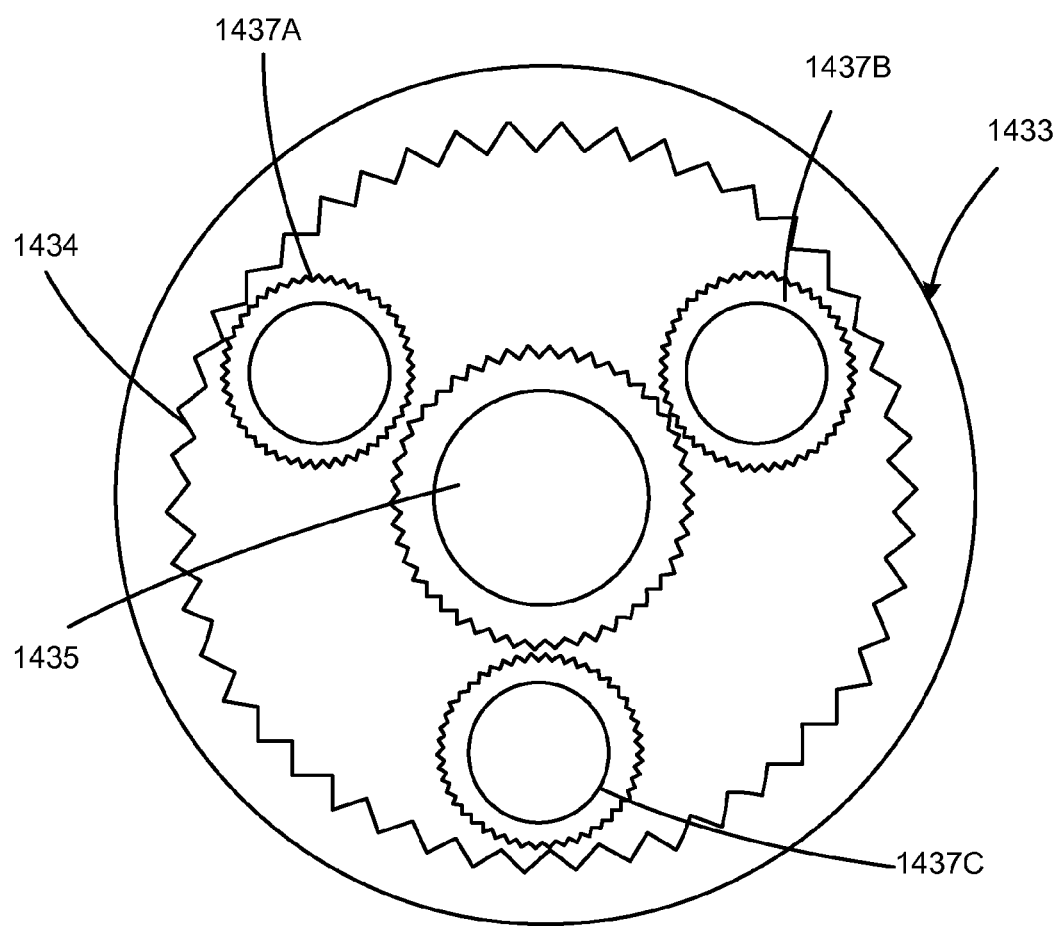
FIG. 15 is block diagram illustrating the exemplary gear mechanism of FIG. 14.

In one exemplary implementation, the gear mechanism 1433 may be a planetary gear mechanism. Referring also to FIG. 15, the gear mechanism 1433 is illustrated as a planetary gear mechanism. In this exemplary implementation, the planetary gear mechanism may include a ring gear 1434 having gear teeth around the internal circumference of the ring. The planetary gear mechanism also may include a sun gear 1435, which may include the shaft extending from the center of the sun gear. The planetary gear mechanism may include one or more planetary gears 1437A-1437C, which are configured to have gear teeth around the outer circumference of each of the planet gears. The planet gears 1437A-1437C may be configured to engage the internal gear teeth of the ring 1434 and the external gear teeth of the sun gear 1435. The planet gears 1437A-1437C may be secured to a planetary carrier.

In this example, the sun gear 1435 may be configured to be the input to the planetary gear mechanism. The rotation of the sun gear 1435 causes the rotation of the planet gears 1437A-1437C, which in turn cause the rotation of the ring 1434. When the ring gear 1434 is coupled to the armature 1403, then rotation of the sun gear by a user causes the ring gear to rotate the armature 1403 and the shaft 1406. If the collet nut 1409 is grounded, then the rotation caused by the rotation of the sun gear 1435 will operate to tighten or loosen the collet depending on the direction of the rotation. In this manner, router tool bits may be changed without the use of tools. When the planetary gear mechanism is decoupled from the armature, then rotation of the sun gear does not operate to rotate the armature and the shaft. In a decoupled state, the router operates as normal.

Referring to FIGS. 16A-16D, an exemplary router 1600 is illustrated. The router 1600 may be configured to operate in multiple different modes. For example, the router 1600 may be configured to operate in a plunge mode. The plunge mode may allow unfettered and free axial movement of the router bit to greater depths into the surface of the workpiece.

The router 1600 also enables a subset of the plunge mode process. For example, the router 1600 may be configured to operate in a mode to plunge to a stop short of the final depth. In another exemplary implementation, the router 1600 may be configured to operate in a fixed base mode of operation. The fixed base mode of operation may constrain the router bit and any motion to that which is dictated by any adjustment system. The fixed base mode of operation also may be configured not to have a spring or biased movement return system.

In another exemplary implementation, the router 1600 may be configured to operate in a mode that enables a user to lock the router at its depth position. For example, once a position of the router bit has been achieved, the user can lock the router at its depth position so that neither a spring return nor a micro-adjust system can be back-driven or moved. The router 1600 also may be configured with improved control positioning. In this manner, the router 1600 may have better ergonomics and control of the modes of operation and performance for the user. The router 1600, as illustrated in FIGS. 16A-16D, illustrate how these various modes of operation may be performed.

Figure 16A:
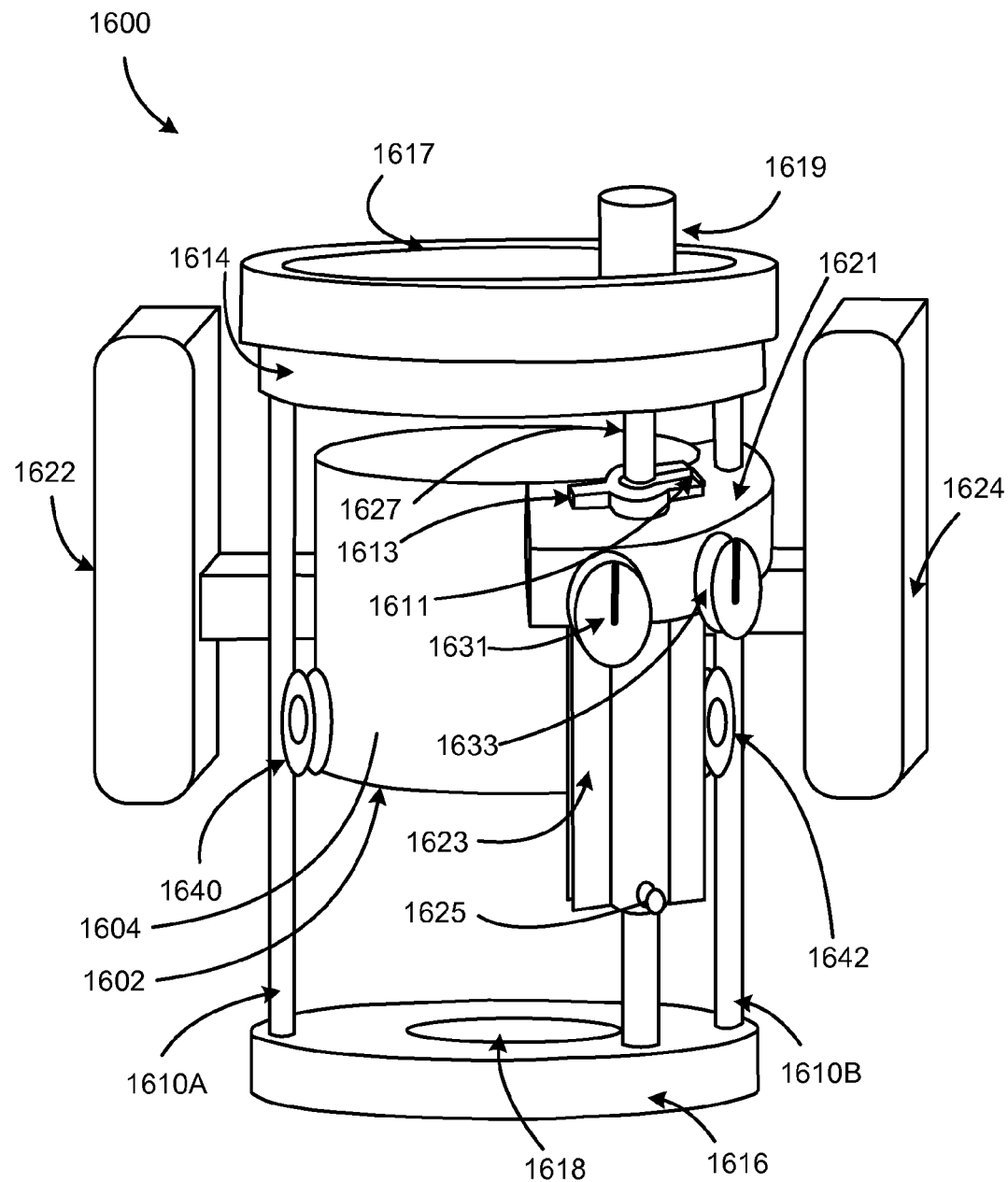
FIGS. 16A-16D are perspective views illustrating an exemplary router.

In FIG. 16A, the router 1600 includes a motor assembly 1602 disposed within a frame or a housing. The motor assembly 1602 may include a motor housing 1604 and a motor disposed within the motor housing 1604. The motor assembly 1602 may be configured to impart rotational motion to a driven shaft (not shown), which in turn imparts rotational motion to a gripped cutting tool (not shown). The frame or housing for the router 1600 may include a top member 1614, a base 1616 having an aperture 1618 and sidewalls (not shown). The aperture 1618 in the base 1616 enables the router bit to penetrate through the base 1616 and to engage a workpiece.

As described above with respect to FIGS. 1-8, the motor assembly 1602 may be configured to traverse in an axial direction between the top member 1614 and the base 1616 along a guide rail system. The guide rail system may include rails 1610A, 1610B. The rails 1610A, 1610B may be the rails 110A, 110B as described above in FIGS. 1-8. Thus, rails 1610A, 1610B may be parallel to each other. The guide rail system also may include multiple rolling element pairs that enable the motor assembly 1602 to traverse along the rails 1610A, 1610B. In one exemplary implementation, a first rolling element pair 1640 may be attached to the motor housing 1604 and be positioned to engage rail 1610A. A second element rolling pair 1642 may be mated to the motor housing 1604 and be positioned to engage the rail 1610B.

The router 1600 may include one or more handles. In one exemplary implementation, the router 1600 includes handles 1622 and 1624. The handles 1622 and 1624 may be of varying shapes and sizes. Although illustrated as elongated rectangles in FIGS. 16A-16D, the handles may be sized and shaped as the handles 122 and 124 described above in FIGS. 1-8 or otherwise. A user may grip the handles 1622 and 1624 to move the router assembly in an axial direction along the rails 1610A, 1610B.

The router 1600 also may include one or more features to enable adjustments to be made to the router height. For example, the router 1600 may include a macro-adjust control 1617 and/or a micro-adjust control 1619. Rotation of the macro-adjust control 1617 or the micro-adjust control 1619 may operate to cause a threaded rod 1627 to rotate. The threaded rod 1627 is rotatably mounted to the macro-adjust control 1617 and the micro-adjust control 1619.

The router 1600 may include a keyed elongated form, also referred to as an extrusion 1623, and a threaded orifice which may be configured to travel the length of the extrusion 1623. A bushing 1621 may surround the extrusion 1623. The bushing 1621 may be an integral part of the motor assembly 1602, even if separate components, and may move as one with the motor assembly 1602.

The extrusion 1623 may include a solid extension 1613 and a split opening 1611. When the solid extension 1613 is locked to the motor, the motion of the motor assembly 1602 is constrained to that which is allowed by the threaded rod 1627. When the solid extension 1613 is not locked to the motor, the motor assembly 1602 and the bushing 1621 are free to move along the rails 1610A, 1610B and the extrusion 1623.

In one implementation, in a plunge mode, the motor assembly 1602 and the bushing 1621 are free to move as one element using the rolling element members 1640 and 1642 to traverse along the rails 1610A and 1610B and the extrusion 1623 slides through the bushing 1621 unfettered. Both the control 1631 and the control 1633 are rotated counter-clockwise to unlock positions. In one implementation, the control 1631 and the control 1633 may include coarse, threaded studs that, when rotated clockwise, move to engage the extrusion 1623. When rotated counterclockwise, the control 1631 and the control 1633 move out of any engagement with the extrusion 1623.

To change the mode of the router 1600 to a fixed base mode, the motor is fixed to the extrusion 1623 and only allowed to move by rotations of the threaded rod 1627. Thus, in a fixed base mode the motor assembly 1602 and the bushing 1621 are not free to slide along the rails 1610A and 1610B. To place the router 1600 in fixed base mode, the control 1631 is rotated clockwise such that the threaded stud of the control engages the extrusion. In this mode, the motor assembly 1602 and the bushing 1621 move only with rotation of the threaded rod 1627 by the macro-adjust control 1617 or the micro-adjust control 1619.

In one implementation, to completely lock the position of the router 1600, the split extension 1611 on the right side of the extrusion 1623 is operated to pinch the threads of the threaded rod 1627. The control 1633 may be an actuator. When the control 1633 is actuated by rotating the control 1633 clockwise, the actuator applies a load to the extrusion 1623 and pinches the threads, which causes the motor assembly 1602 to completely lock to the extrusion 1623. Actuation of the actuator 1633 also rotationally locks the threaded rod 1627 to the extrusion 1623. In this locked mode, the threaded rod 1672 will not operate to move the motor assembly 1602.

If the router 1600 is unlocked by rotating the control 1633 to an unlocked position, but configured in a fixed-base mode (i.e., when the control 1631 is applying a locking load against the left solid extension 1613 on the extrusion 1623) rotating the threaded rod 1627 will drive the motor assembly 1602 up or down at a ratio of one turn advancing the motor assembly 1602 by one thread pitch. This may be accomplished by rotating the micro-adjust control 1619. In this manner, the motor assembly 1602 may be positioned precisely by a user. This mode of operation may be good for high precision work. If the operator intends to move quickly from one depth to the next, then a different mode of operation may be used.

In one exemplary implementation, the micro-adjust control 1619 may include gear teeth on the outside periphery of the knob. The macro-adjust control 1617 may include internal gear teeth on its internal periphery and be configured to interface with the gear teeth on the outer periphery of the micro-adjust control 1619. The gear teeth on the macro-adjust control 1617 may include a higher tooth count may include a higher tooth count than the gear teeth on the outside periphery of the micro-adjust control 1619. In this manner, one turn of the macro-adjust control 1617 would result in multiple turns of the micro-adjust control 1619.

In one exemplary implementation, if a gear ratio of 10:1 is achieved at this interface between the micro-adjust control 1619 and the macro-adjust control 1617, then rotation of the macro-adjust control 1617 will advance the motor assembly 1602 by 10 threads along the threaded rod 1627. A different gear ratio may be used to attain different rotational advancement of the motor assembly 1602 in relation to rotation of the macro-adjust control 1617.

As shown in the example of FIG. 16A, the macro-adjust control 1617 and the micro-adjust control 1619 are located at a top of the router 1600. In this manner, the user is able to make adjustments to the router potentially without shutting down power to the router. In one exemplary implementation, the extrusion 1623 includes an integrated stop 1625. The integrated stop 1625 may be positioned at a bottom of the extrusion 1623 and be configured to limit the plunge distance. The motor assembly 1602 may be configured to stop when the bottom of the bushing 1621 hits the integrated stop 1625.

Figure 16B:
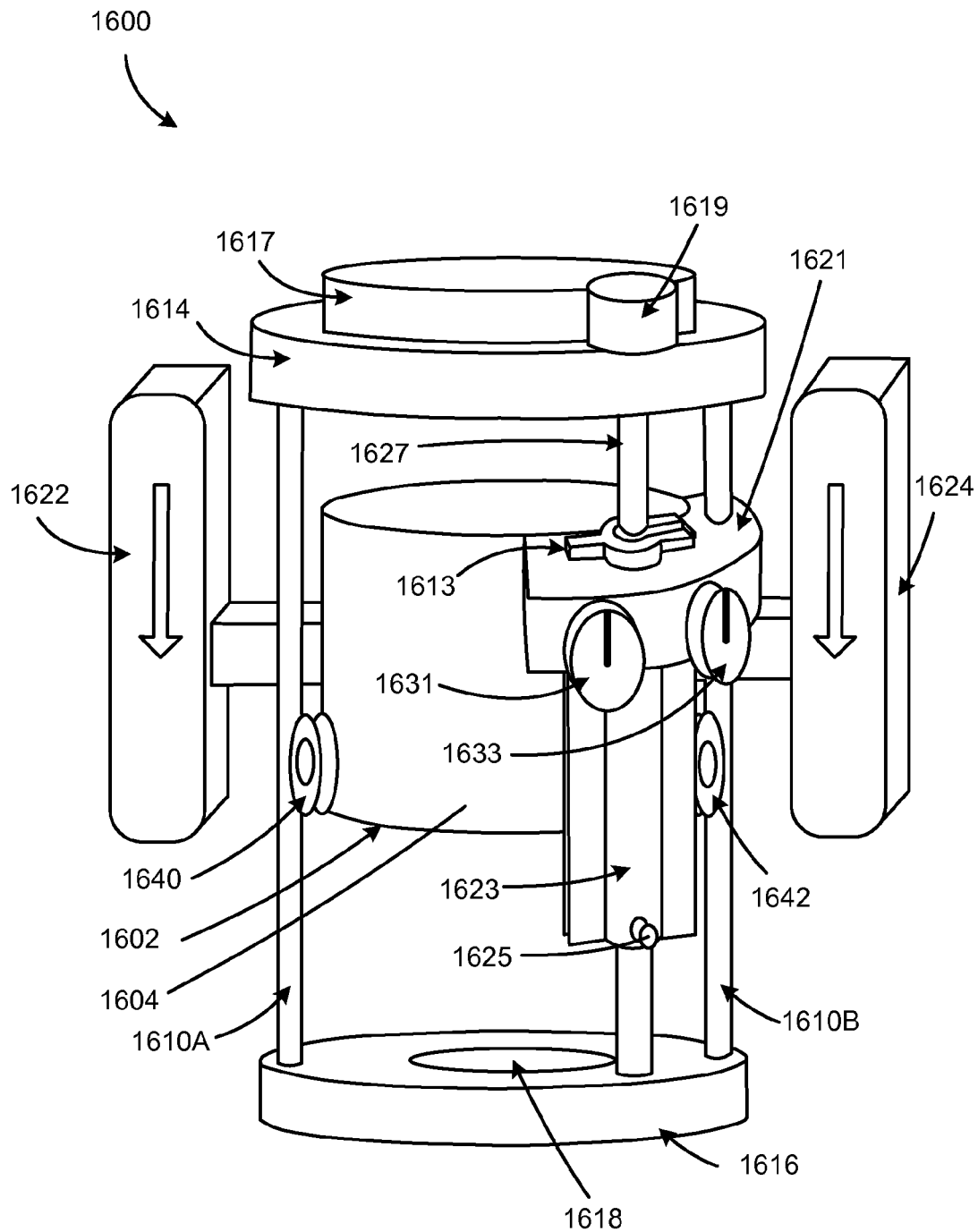
Figure 16C:
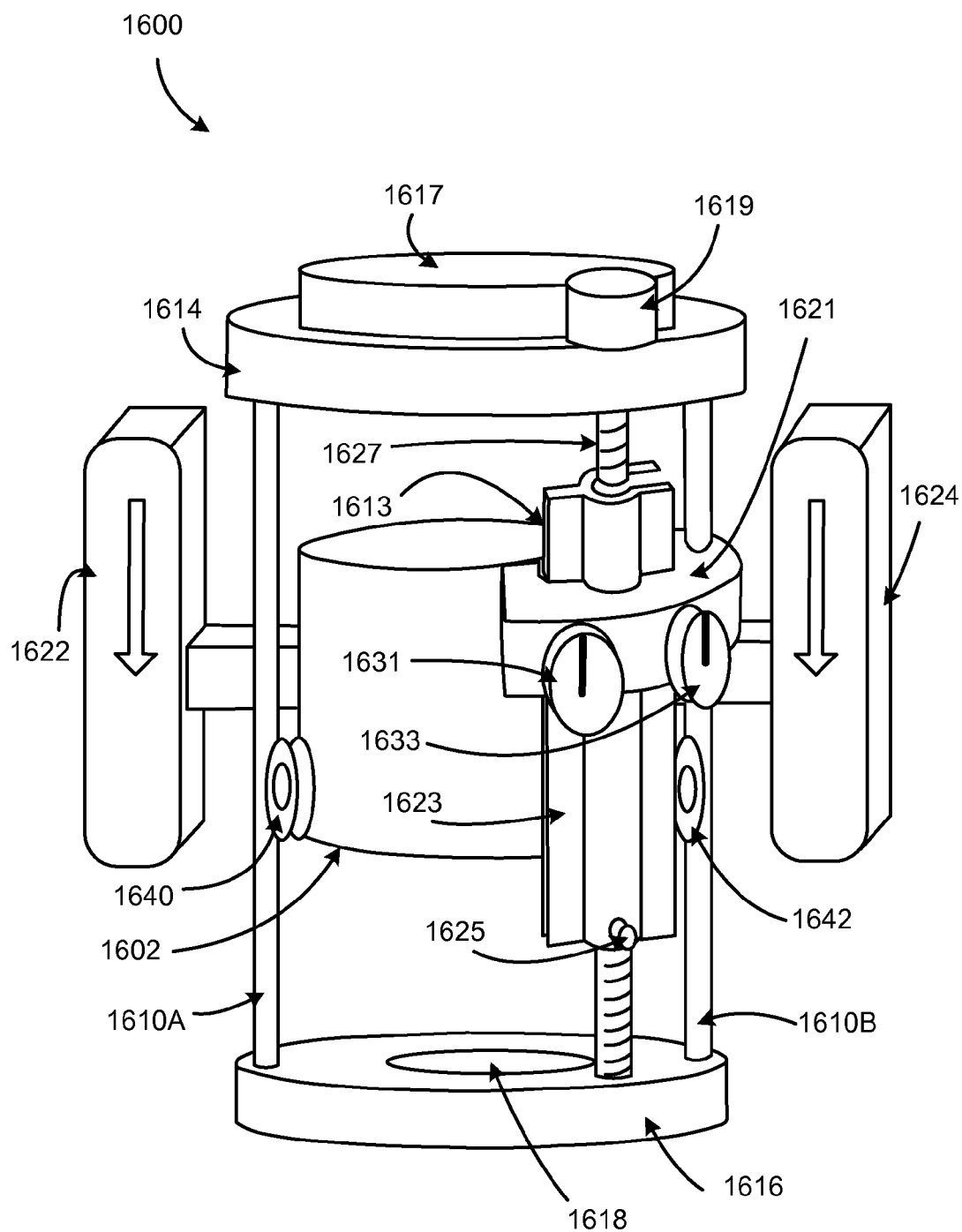
Figure 16D:
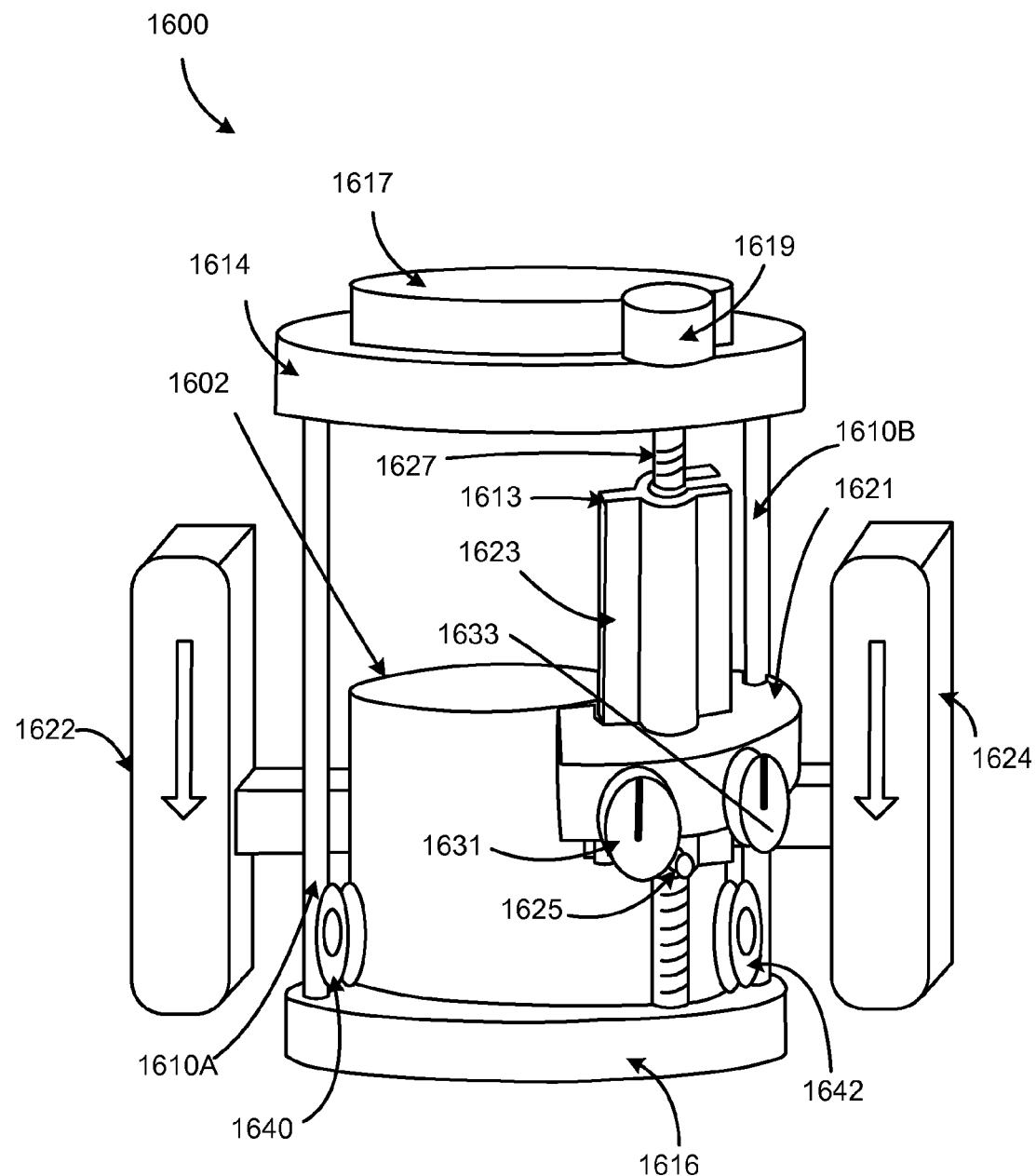

Referring also to FIGS. 16B-16D, an exemplary illustration of the router 1600 in a plunge mode is illustrated. In FIG. 16B, the control 1631 and the control 1633 are in an unlocked position and are not providing any actuating load against the extrusion 1623. Thus, the split opening 1611 is not squeezed against the threaded rod 1627. In this manner, as described above, the motor assembly 1602 and the bushing 1621 are free to travel in an axial direction along the rails 1610A, 1610B. As shown by the arrows illustrated on the handles 1622 and 1624 (arrows are for illustration purposes only), the router 1600 is being moved in an axial position towards the base 1616.

Referring to FIG. 16C, the router 1600 has been moved further along the extrusion 1623 and, correspondingly, further along the rails 1610A, 1610B. As illustrated in FIG. 16C, the extrusion 1623 may be moved in an axial direction along the threaded rod 1627 by either the macro-adjust control 1617 or the micro-adjust control 1619. The motor assembly 1602 traverses along the extrusion 1623 in the plunge mode.

As illustrated in FIG. 16D, the motor assembly 1602 may be plunged to a point until the bushing 1621 hits the stop 1625 at the end of the extrusion 1623. Since the stop is located at the end of the extrusion, the motor assembly 1602 will not plunge any further than the protruding stop 1625 will allow. As discussed above, the position of the stop 1625 may be raised or lowered by turning either the macro-adjustment knob 1617 or the micro-adjust control 1619.

Referring to FIGS. 17A-17D, the router 1600 is illustrated in a plunge-to-stop mode of operation. A common procedure in plunge routing is to break a deep routing operation into a series of shallower cuts so as not to overstress the router or the bit, as well as maintain an accurate and high quality cut. Typically, this process may be facilitated by interacting a stop rod on the router body with a series of stops on the router base. These stops may be mounted on a rotary turret so the operator can quickly change from one depth setting to the next. These stops may be spaced about a ¼ inch in depth apart from each other. However, because of the close proximity to the router bit, the user typically stops the motor, rotates the turret, restarts the motor and then plunges to the next depth. This process may be inefficient since the operator needs to stop the router in between each adjustment and certain materials and bit sizes will allow a greater depth of cut than the typical ¼ step.

The router 1600, as illustrated in FIGS. 17A-17D, uses the integrated stop 1625 on the extrusion 1623 to limit the plunge distance. Router 1600 does not include a turret mechanism with the series of stops. Instead, as discussed above, the stop 1625 is integrated on the extrusion 1623 to limit the plunge distance. The stop 1625 may be quickly moved downward by a partial turn of the macro-adjust control 1617. Since this control is located at the top of the router, it is possible to safely make this adjustment without shutting down the power to the router. Additionally, by making the adjustment a variable, the user may go as deep as the user feels comfortable therefore decreasing the overall cutting process time.

Figure 17A:
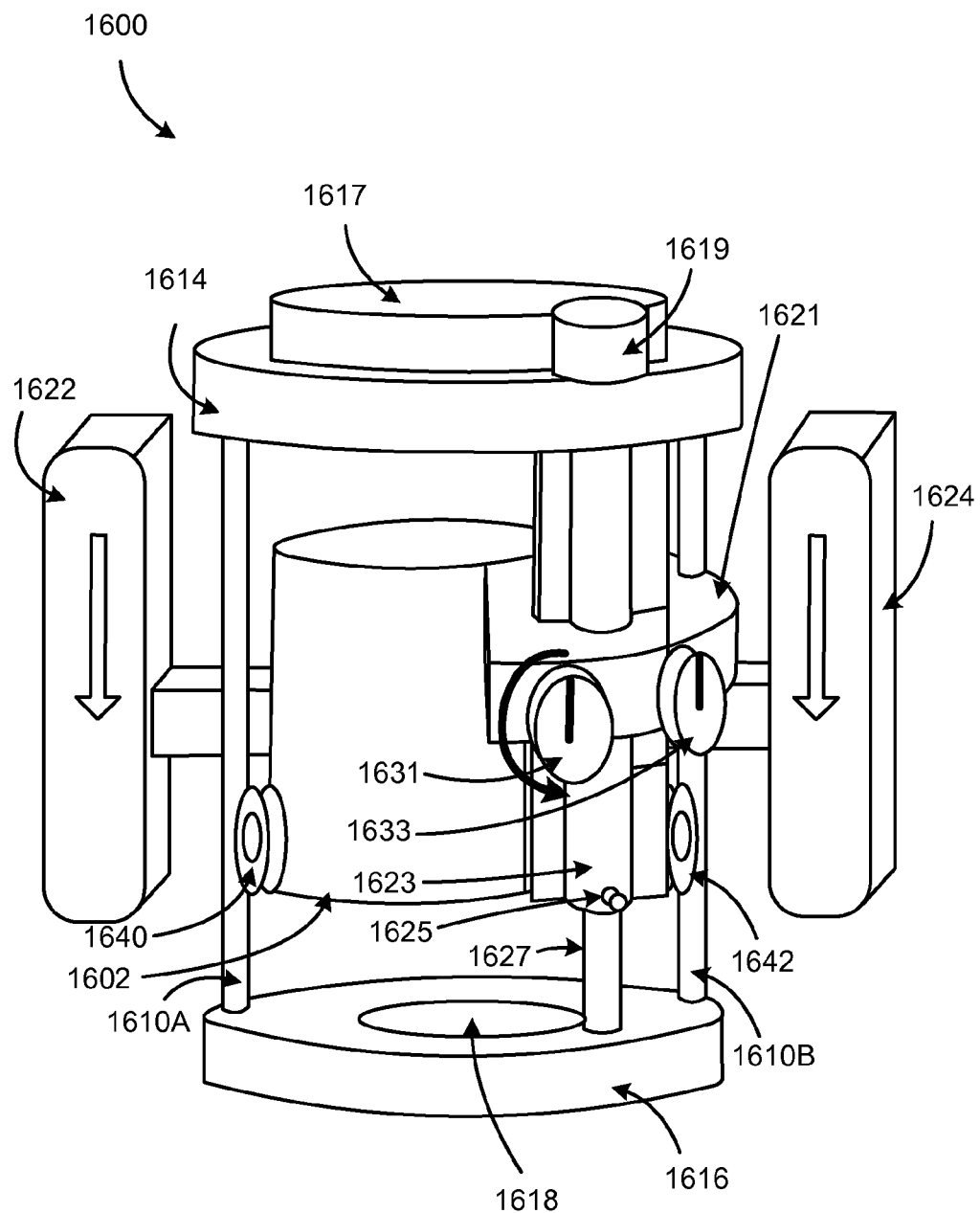
FIGS. 17A-17D are perspective views illustrating an exemplary router.
Figure 17B:
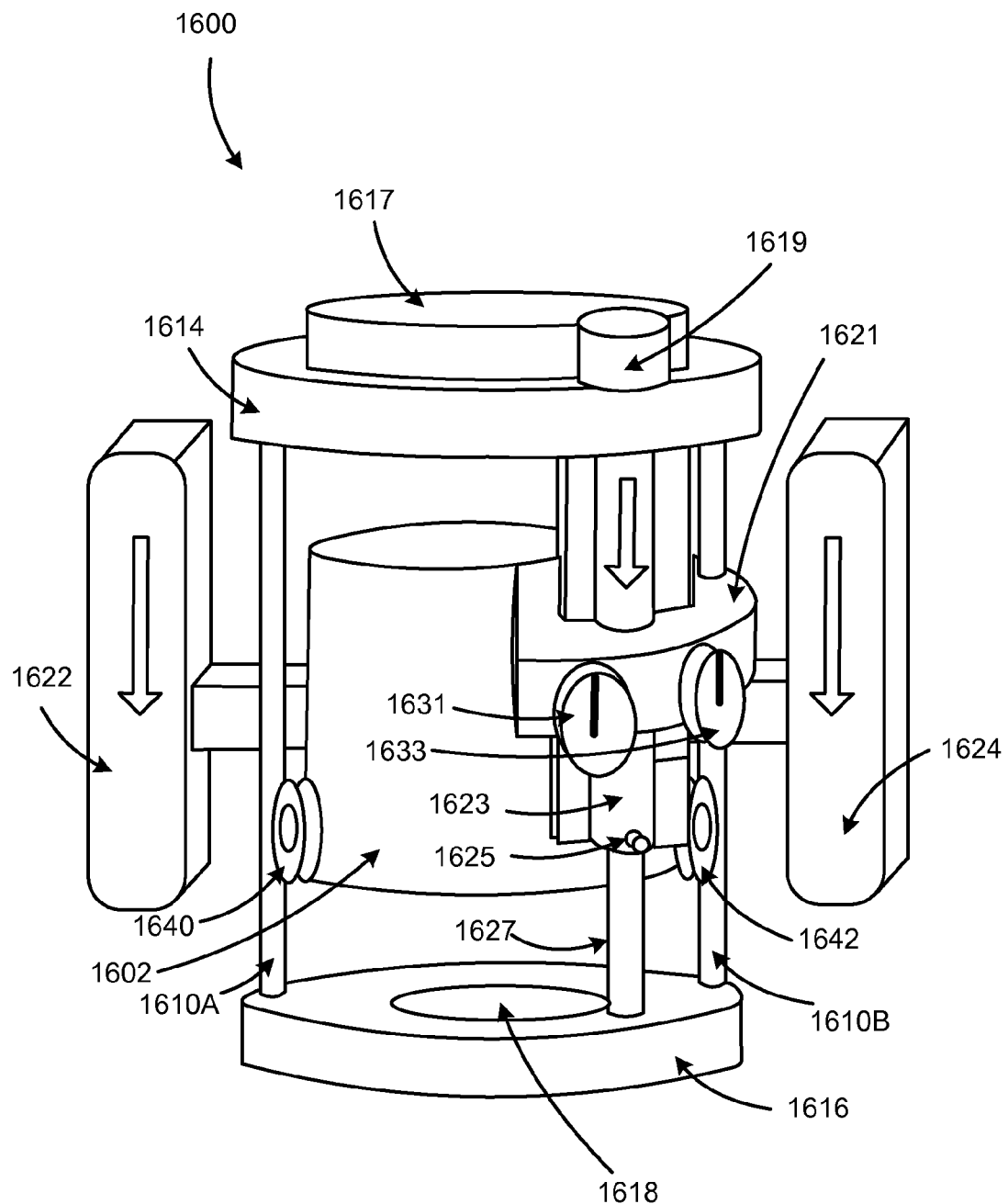
Figure 17C:
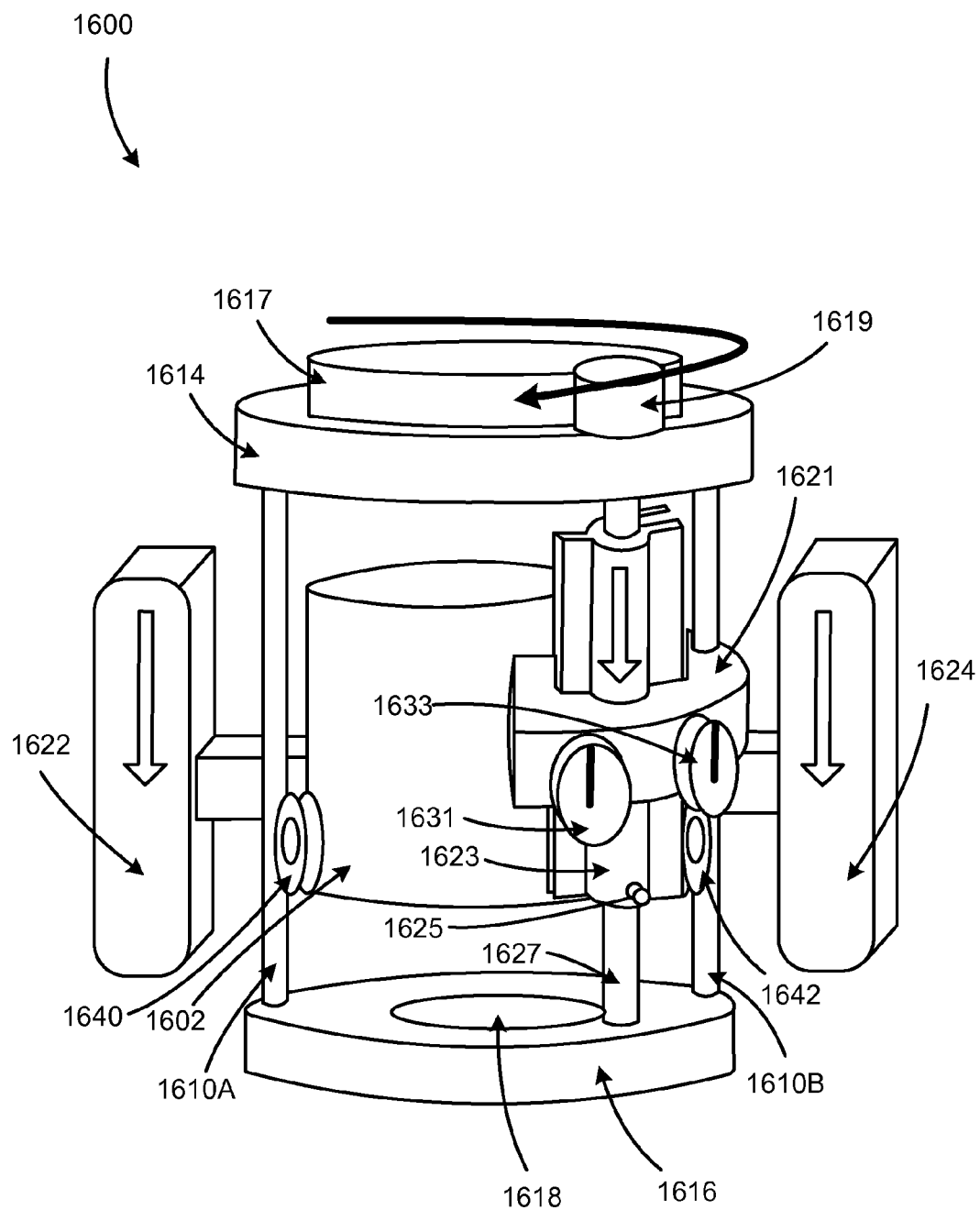
Figure 17D:
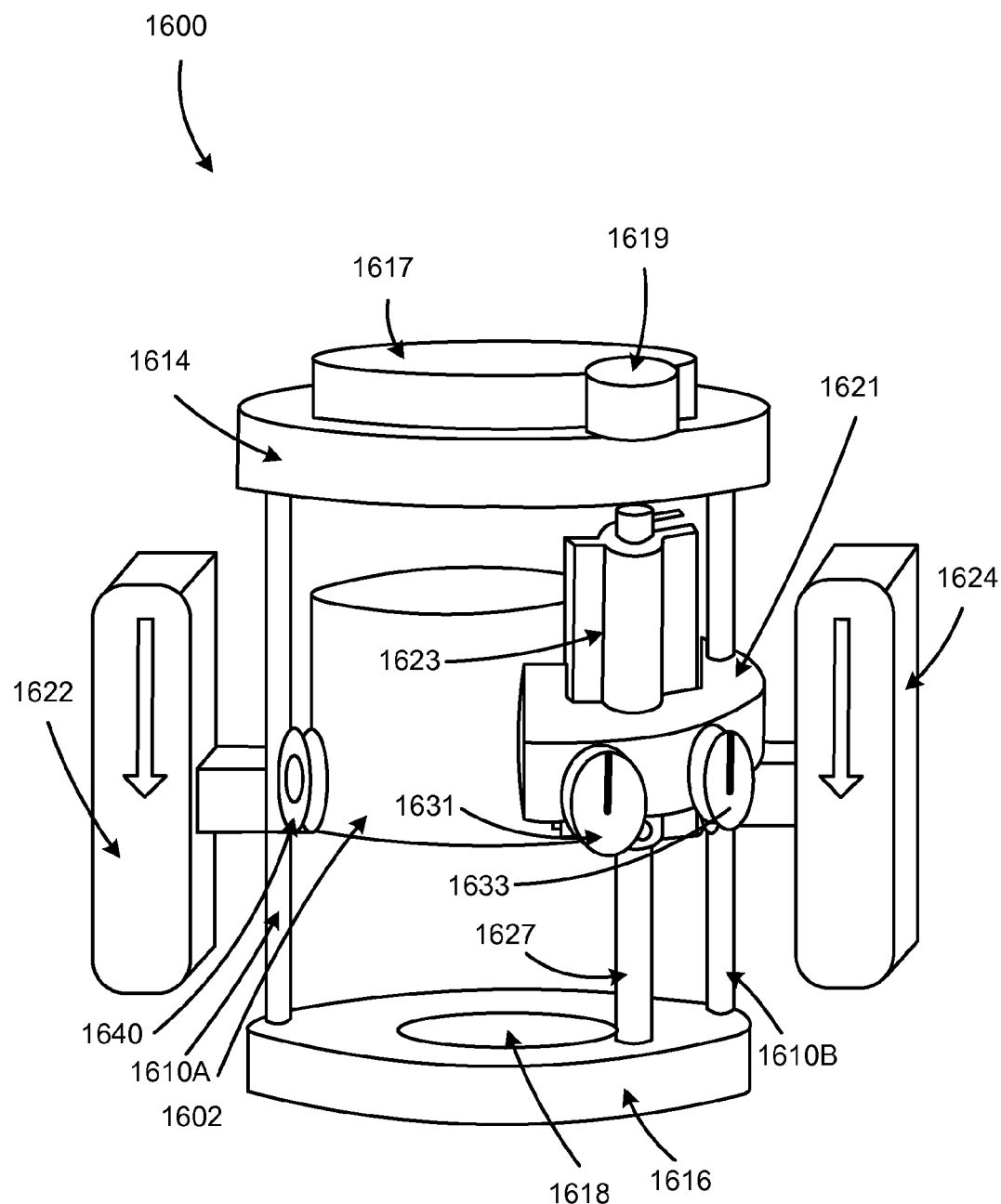

As discussed above, the control 1631 is used to lock or release the motor assembly 1602 to the extrusion 1623. By rotating this knob as illustrated in FIG. 17A, the extrusion 1623 is free to be moved by the macro-adjust control 1617 or the micro-adjust control 1619. As illustrated in FIG. 17B, the arrow on the extrusion 1623 illustrates that the extrusion may be moved axially and adjusted up and down in order to change the position of the stop 1625. As shown in FIG. 17C, the macro-adjust control 1617 may be used to raise and lower the extrusion, which in turn raises and lowers the position of the stop 1625. Similarly, the micro-adjust control 1619 may be used to incrementally adjust the position of the stop 1625. FIG. 17D illustrates that once the motor assembly and its attached bushing 1621 reach the stop position 1625 that the router may not plunge any further toward the base 1616.

Figure 18:
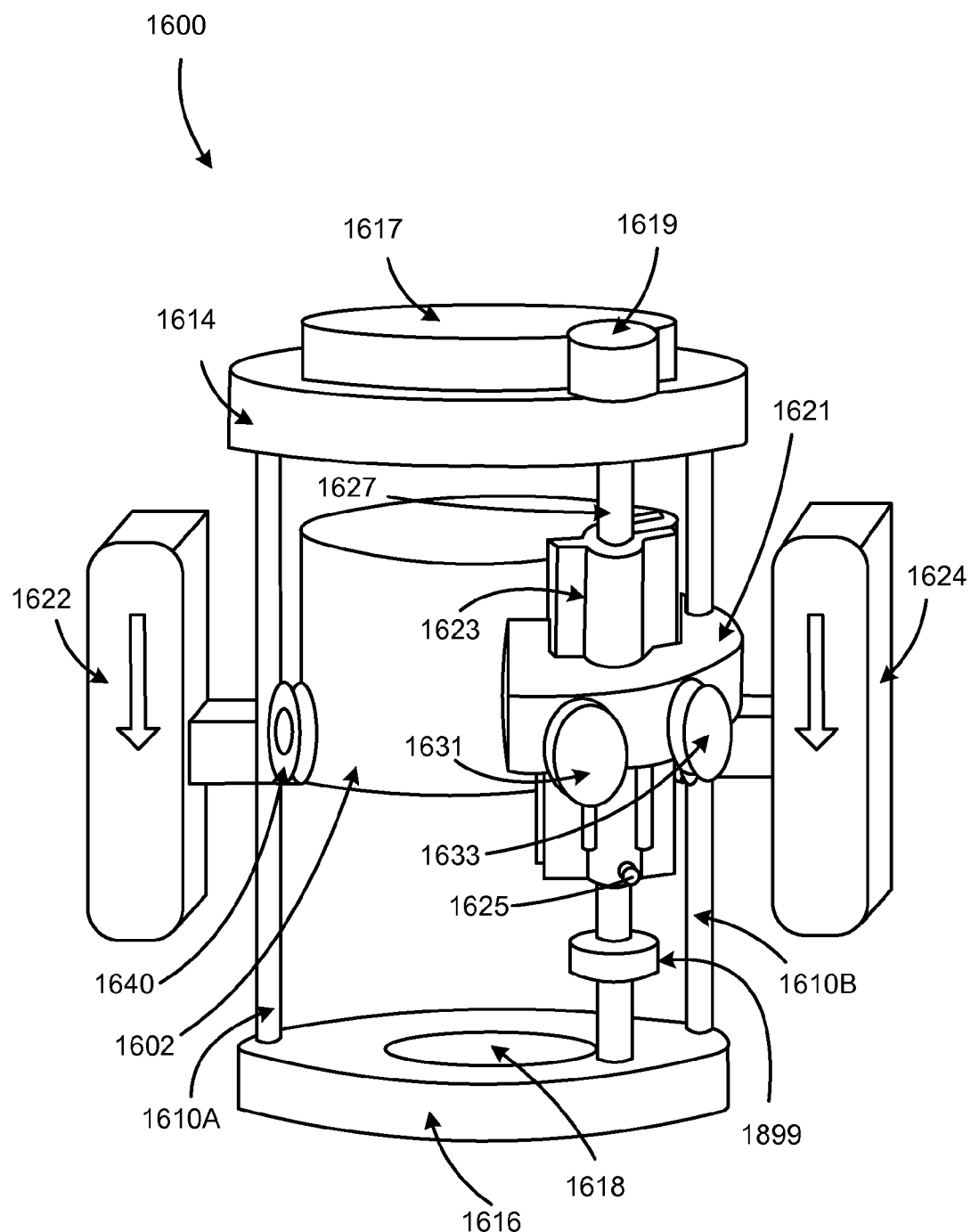
FIG. 18 is a perspective view illustrating an exemplary router.

Referring to FIG. 18, the router 1600 is illustrated with a final stop 1899. The final stop 1899 is illustrated as a knurled nut onto the threaded rod 1627 below the extrusion 1623. This final stop 1899 may be used by the user to set a final position for the motor assembly 1602 and bushing 1621. The stop 1625 on the extrusion 1623 may be used as a stop during plunge mode, but it also may be desirable to position a final and absolute stop at some predetermined depth. For example, this final stop 1899 may be used when cutting a channel or pocket to a fixed depth. To use the final stop 1899, the integrated stop 1625 may be movable into and out of the extrusion 1623 such that the integrated stop 1625 is pushed into the extrusion 1623 and out of the way of stopping the movement of the motor assembly 1602 and the bushing 1621. With the integrated stop 1625 removed, the bushing 1621 and the motor assembly 1602 may translate off the end of the extrusion 1623. The motor assembly 1602 and the bushing 1621 will then be free to translate down the rails 1610A, 1610B until they hit the final stop 1899, which is independent of the extrusion 1623.

Figure 19A:
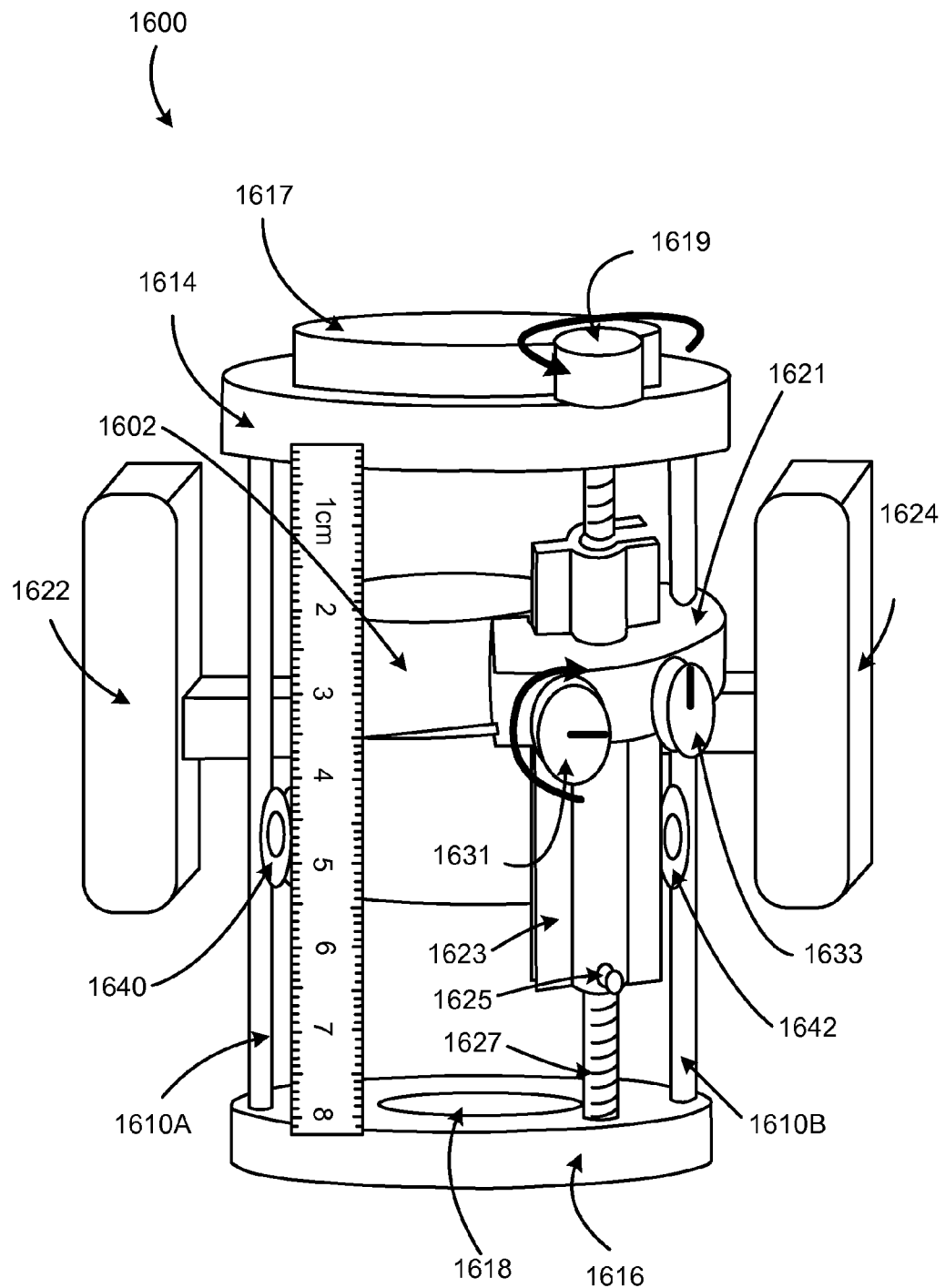
FIGS. 19A and 19B are perspective views illustrating an exemplary router.
Figure 19B:
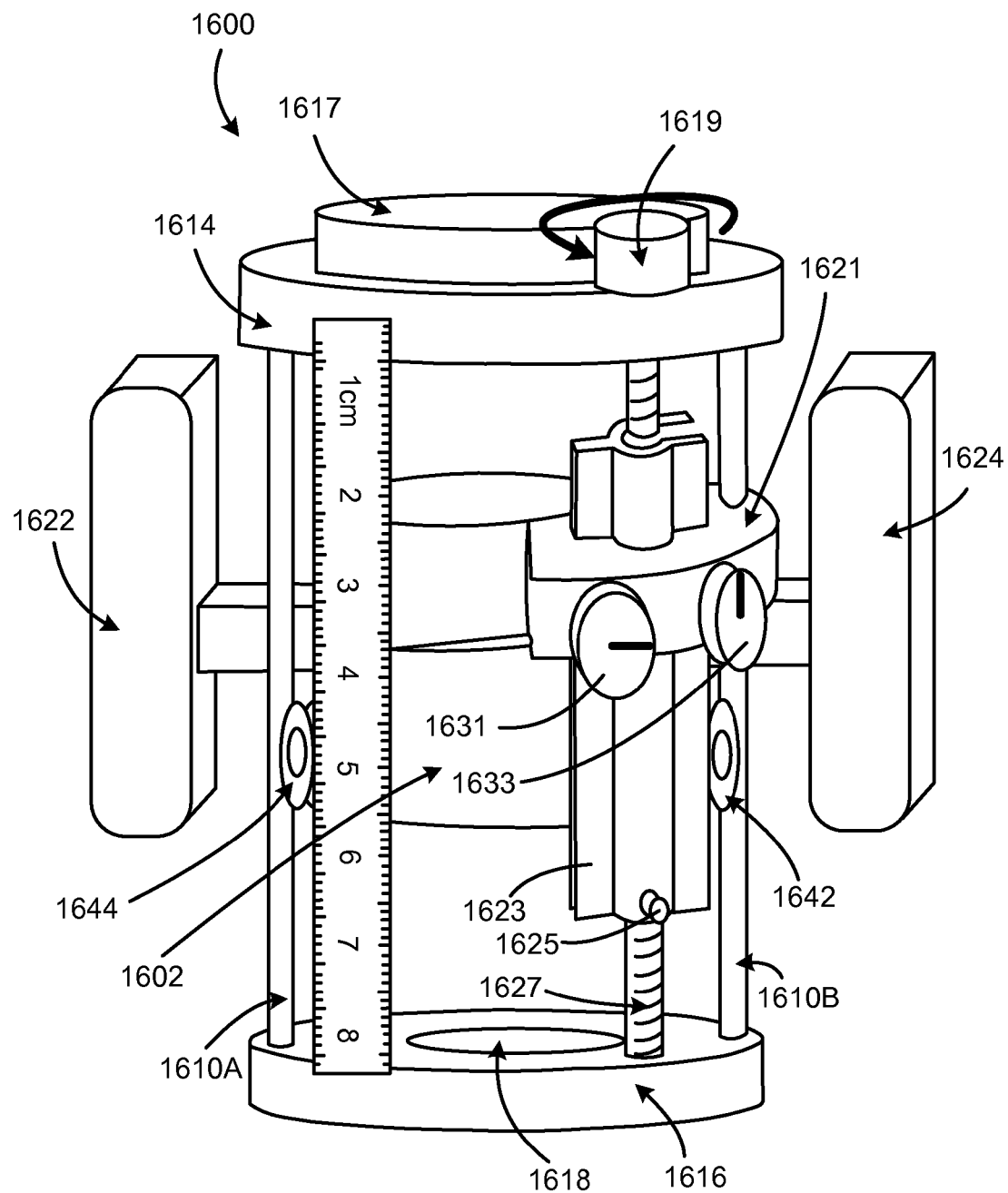

FIGS. 19A-19B illustrate the adjustments made in the height of the motor assembly 1602 when using the micro-adjust control 1619. In this illustration, the control 1631 is rotated to a position to engage the extrusion 1623 to operate the router 1600 in a fixed base mode and to enable operation of the micro-adjust control 1619 to affect the movement of the motor assembly 1602 and the bushing 1621. When the micro-adjust control 1619 is rotated as shown by the arrow in FIG. 19A, the distance moved as shown by the ruler in the figure (ruler is for illustration purposes only and not included as part of the router 1600), the distance travelled as shown in FIG. 19B corresponds to a small amount. Additionally, because the micro-adjust control 1619 is enabled by rotating threaded rod 1627 and the threaded rod 1627 is accessible at either the top member 1614 or at the base 1616, the micro-adjust feature may be achieved through the base 1616. This may be advantageous if the router 1600 is hanging in a router table.

Figure 20:
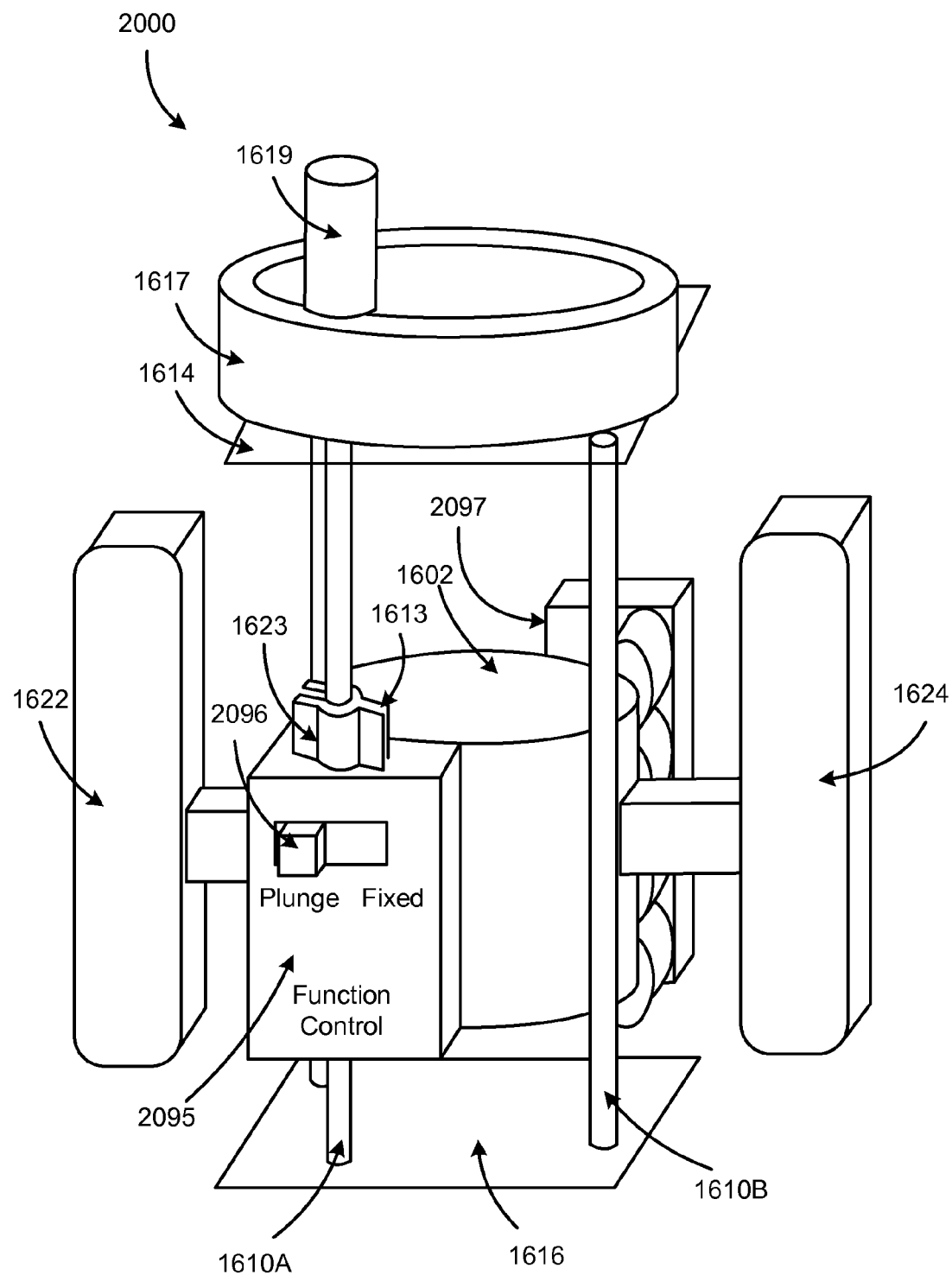
FIG. 20 is a perspective view illustrating an exemplary router.

Referring to FIG. 20, a router 2000 is illustrated. The router 2000 may be similar to the router 1600 described above with respect to FIGS. 16A-19. The reference numbers in FIG. 20 indicate like components from FIGS. 16A-19. The router 2000 may include a brushless motor as part of the motor assembly 1602. The brushless motor may provide multiple features for the router. For example, the use of a brushless motor may enable a soft start, electronic braking, speed control, and superior power density.

The brushless motor may use solid state components to perform electrical switching and these components may be positioned in any remote location relative to the motor. For example, the router 2000 includes a control module 2097 that is positioned along the side of the motor. By placing the control module 2097 adjacent to the motor assembly 1602, the overall height of the router 2000 may be reduced when compared with other routers having conventional motors with commutators to control switching. The positioning of the components in conjunction with the use of a brushless motor may enable a more compact router assembly to be obtained, where the router includes a shorter height and a lower center of gravity.

By having a cylindrical shaped motor, the corners of the router assembly may be opened up to position other controls for the router 2000. In one exemplary implementation, a function control unit 2095 may be positioned near the handle 1622. The positioning of a function control unit 2095 near the handle 1622 enables the user to operate the function controls and at the same time remain in contact with the handle 1622.

The function control unit 2095 may include a switch 2096 that operates to actuate an actuator to operate on the extrusion 1623. As discussed above with respect to FIGS. 16A-16D, the router 2000 may be operated in multiple different modes. For example, the router 2000 may be operated in a plunge mode. In this example, the switch 2096 is placed to the plunge position on the function control unit 2095. The plunge mode of operation means that the actuator is not providing any load on the extrusion 1623. Therefore, the extrusion is not clamped around the threaded rod 1627 and the bushing 1621 is not locked to the extrusion 1623 and the motor assembly 1602 and the bushing 1621 are free to traverse along the rails 1610A, 1610B.

When the switch 2096 is placed in the fixed mode of operation, the actuator applies a load to the solid extension 1613. In this manner, the router 2000 may be operated in a fixed-base mode of operation.

Figure 21:
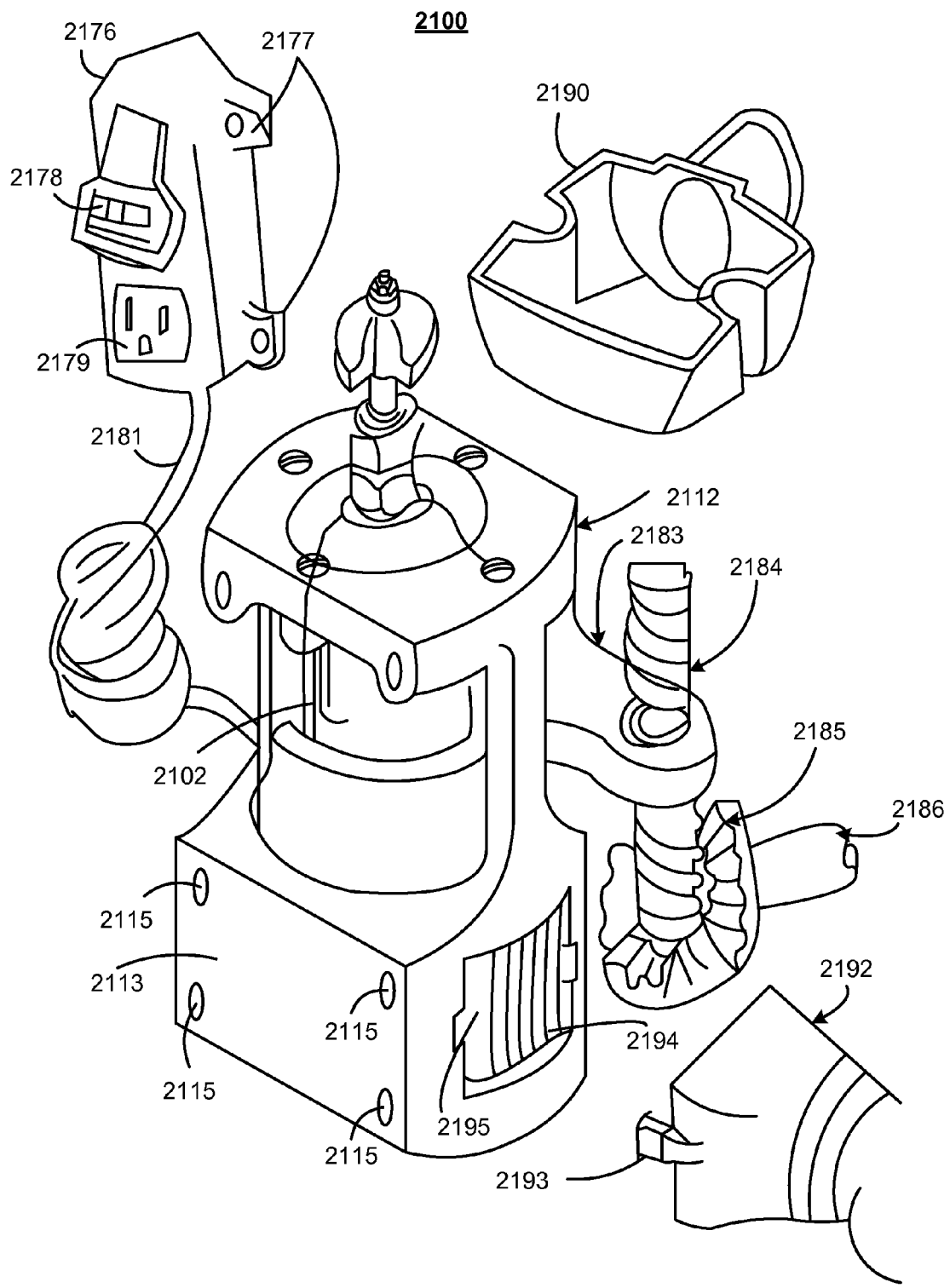
FIG. 21 is a perspective view illustrating an exemplary router.

Referring to FIG. 21, a router 2100 may be designed for stationary use. The router 2100 may be configured to operate in a stationary mode as opposed to a portable, hand-held mode. The router 2100 may include a motor assembly 2102 that is disposed within a frame 2112. The frame 2112 may include multiple flat mounting surfaces, such as, for example flat mounting surface 2113 having steel threaded inserts 2115. The flat mounting surface 2113 also may be included on the other sides of the router that are not visible in FIG. 21. The flat mounting surface 2113 and the threaded inserts 2115 enable the router 2100 to be mounted to a router table. In other exemplary implementations, the flat mounting surface 2113 enables a user to attach the router to other types of fixtures as well. Each of the sides of the router may be a flat surface to enable the router to be mounted in different types of fixtures.

The router 2100 includes a collet nut 2109 which may be adjusted to loosen and tighten a collet (not shown), which is configured to grip a cutting tool 2108. The collet nut 2109 may be positioned to project above a router table to which the router 2100 may be mounted. The collet nut projecting above the plane of the base member of the router may enable for easier bit change. The projection of the collet nut 2109 above the plane of the base enables a user to place multiple wrenches around the collet nut and the arbor nut and to change the cutting tool 2108.

The router 2100 also may include a remote switch box 2176 having an outlet 2179. The remote switch box 2176 may include an activation on/off switch 2178 and an outlet 2179 for plugging in other accessories or powered units such as, for example, a powered vacuum. The switch 2176 may be configured with mounting members 2177 to mount the switch to a wall or other unit such as, for example, a router table. The switch 2176 may provide power to the router 2100 through electrical cord 2181.

The router 2100 also may include a rigid stationary vacuum attachment 2190. The vacuum attachment 2190 may be configured to attach to the router 2100 and include an opening to attach a separate vacuum hose. The size and shape of the vacuum attachment port can be larger than on a portable router since visibility is not a concern. Also, the material of the vacuum attachment can be opaque, instead of clear. The opaque material may allow for a stronger part.

The router 2100 also may include an anti-backlash height adjustment screw 2184. The anti-backlash height adjustment screw 2184 may enable the overall router unit 2100 to be raised and lowered in relation to a fixture that it may be mounted to. The router 2100 may include an elongated member 2183 having a threaded bore to receive the anti-backlash height adjustment screw 2184. The elongated member 2183 may be attached to the housing 2112. The height adjustment screw 2184 may be adjusted using the handle 2186 and a set of bevel gears 2185. Rotation of the handle 2186 causes the bevel gears to thread the height adjustment screw 2184 through the threaded bore opening in the elongated member 2183.

The router 2100 may be configured to have an opening 2194 to enable access for air ventilation to be forced to cool the motor assembly 2102. A remote air slot ducting 2192 may be configured to attach to the opening 2194. The remote motor air slot ducting 2192 may include an attachment mechanism 2193 that mates with a corresponding mated opening 2195 to secure the air slot ducting 2192 to the housing 2112. Air may be forced through the air slot ducting 2192 through the opening 2194 to provide cooling for the motor assembly 2102. In this manner, clean air may be brought from outside the dust environment of a router table and may be moved several feet away for example from the dust environment in order to provide clean air to cool the motor assembly.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A hand-manipulatable portable router, comprising:
   a motor assembly that is arranged and configured to hold a router tool and to impart rotation to the router tool;
   a frame that is fixed in size and that is configured to house the motor assembly, the frame comprising:
   a first member,
   a base disposed on an end of the router opposite the first member, the base having an aperture to enable the router tool to engage a workpiece, wherein the aperture allows the router tool to pass therethrough to engage the workpiece, and
   side members having a fixed length, the side members coupling the first member and the base; and
   a first rail and a second rail each disposed along and against a respective one of the side members and within the frame between the first member and the base, the first rail and the second rail configured to permit the motor assembly and the router tool to slide towards and away from the aperture to bring the router tool into and out of engagement with the workpiece.

2. The router of claim 1 wherein the first member comprises:
   a body portion; and
   a flanged portion that extends beyond the body portion.

3. The router of claim 2 wherein the first member is configured to be secured in a table.

4. The router of claim 2 wherein the first member is configured to be secured in a structure having a pin for use as a pin router.

5. The router of claim 1 further comprising:
   a first rolling element pair mounted to the motor assembly and a second rolling element pair mounted to the motor assembly, wherein the first rolling element pair engages the first rail and the second rolling element pair engages the second rail.

6. The router of claim 5 wherein the first rolling element pair comprises a first ball bearing attached to the motor assembly and a second ball bearing attached to the motor assembly.

7. The router of claim 6 wherein the second rolling element pair comprises a first ball bearing attached to the motor assembly and a second ball bearing attached to the motor assembly.

8. The router of claim 7 further comprising a third rolling element pair mounted to the motor assembly, wherein the third rolling element pair engages the first rail.

9. The router of claim 1 further comprising a first handle attached to the motor assembly and a second handle attached to the motor assembly.

10. The router of claim 1 wherein the frame is configured to be secured in a router table.

11. A hand-manipulatable portable router, comprising:
a motor assembly that is arranged and configured to hold a router tool and to impart rotation to the router tool;
a frame that is fixed in size and that is configured to house the motor assembly, the frame comprising:
  a first member,
  a base disposed on an end of the router opposite the first member, the base having an aperture to enable the router tool to engage a workpiece, wherein the aperture allows the router tool to pass therethrough to engage the workpiece, and
  side members having a fixed length, the side members coupling the first member and the base;
a first rail arranged on and along one of the side members and within the frame between the first member and the base, and
a first handle attached to one side of the motor assembly and a second handle attached to an opposite side of the motor assembly, wherein the first handle and the second handle enable a user to move the motor assembly so as to slide along the first rail towards and away from the aperture within the frame that is fixed in size to bring the router tool into and out of engagement with the workpiece.

12. The router of claim 11, further comprising means for sliding the motor assembly towards and away from the aperture to bring the router tool into and out of engagement with the workpiece.

13. The router of claim 11 wherein the first member comprises:
a body portion; and
a flanged portion that extends beyond the body portion.

14. The router of claim 13 wherein the first member is configured to be secured in a table.

15. The router of claim 13 wherein the first member is configured to be secured in a structure having a pin for use as a pin router.

16. The router of claim 11 further comprising a second rail disposed along another one of the side members and within the frame between the first member and the base, the first rail and the second rail configured to permit the motor assembly and the router tool to slide towards and away from the aperture to bring the router tool into and out of engagement with the workpiece.

17. The router of claim 16 further comprising a first rolling element pair mounted to the motor assembly and a second rolling element pair mounted to the motor assembly, wherein the first rolling element pair engages the first rail and the second rolling element pair engages the second rail.

18. The router of claim 17 wherein the first rolling element pair comprises a first ball bearing attached to the motor assembly and a second ball bearing attached to the motor assembly.

19. The router of claim 18 wherein the second rolling element pair comprises a first ball bearing attached to the motor assembly and a second ball bearing attached to the motor assembly.

20. The router of claim 19 further comprising a third rolling element pair mounted to the motor assembly, wherein the third rolling element pair engages the first rail.

* * * * *